(12) United States Patent
Mitlin et al.

(10) Patent No.: US 10,256,050 B2
(45) Date of Patent: Apr. 9, 2019

(54) HYDROGEL DERIVED CARBON FOR ENERGY STORAGE DEVICES

(71) Applicant: David Mitlin, Hannawa Falls, NY (US)

(72) Inventors: David Mitlin, Hannawa Falls, NY (US); Jia Ding, Edmonton AB (CA)

(73) Assignee: SPARKLE POWER LLC, Rochester, NY (US)

( * ) Notice: Subject to any disclaimer, the term of this patent is extended or adjusted under 35 U.S.C. 154(b) by 188 days.

(21) Appl. No.: 15/390,302

(22) Filed: Dec. 23, 2016

(65) Prior Publication Data
US 2018/0182564 A1 Jun. 28, 2018

(51) Int. Cl.

| | |
|---|---|
| *H01M 10/0525* | (2010.01) |
| *H01M 10/054* | (2010.01) |
| *H01M 4/587* | (2010.01) |
| *H01G 11/36* | (2013.01) |
| *H01G 11/06* | (2013.01) |
| *H01G 11/50* | (2013.01) |
| *H01G 11/46* | (2013.01) |
| *B82Y 40/00* | (2011.01) |
| *C01B 37/00* | (2006.01) |

(52) U.S. Cl.
CPC .............. *H01G 11/36* (2013.01); *B82Y 40/00* (2013.01); *C01B 37/00* (2013.01); *H01G 11/06* (2013.01); *H01G 11/46* (2013.01); *H01G 11/50* (2013.01); *H01M 4/587* (2013.01); *H01M 10/0525* (2013.01); *H01M 10/054* (2013.01)

(58) Field of Classification Search
CPC ... H01G 11/36; H01G 11/50; H01M 10/0525; H01M 4/587; H01M 10/054
See application file for complete search history.

(56) References Cited

U.S. PATENT DOCUMENTS

| | | | |
|---|---|---|---|
| 2014/0113200 A1* | 4/2014 | Seymour ................ | H01G 11/38 429/231.8 |
| 2015/0084603 A1* | 3/2015 | Thillaiyan ......... | H01M 10/0567 320/162 |
| 2018/0083331 A1* | 3/2018 | Mitlin ................ | H01M 12/005 |

\* cited by examiner

*Primary Examiner* — Stewart A Fraser
(74) *Attorney, Agent, or Firm* — Murtha Cullina LLP

(57) ABSTRACT

An energy storage device, such as a sodium ion capacitor, including an anode and a cathode, at least one of the anode and the cathode including a nitrogen and oxygen functionalized carbon (NOFC). The NOFC has a nitrogen content greater than 4 wt %, such as 13 wt %, an oxygen content greater than 8 wt %, such as 11 wt %, and a surface area greater than 800 m$^2$g$^{-1}$, such as 945 m$^2$g$^{-1}$. The energy storage device has favorable reversible and rate capability, such as 437 mAhg$^{-1}$ at 100 mAg$^{-1}$, and 185 mAhg$^{-1}$ at 1600 mA g$^{-1}$.

26 Claims, 21 Drawing Sheets

HYDROGEL DERIVED CARBON FOR ENERGY STORAGE DEVICES

FIELD OF THE INVENTION

The invention relates to carbons and their use in energy storage devices, and more specifically to a hydrogel derived carbon for use in energy storage devices such as sodium and lithium ion batteries and capacitors.

BACKGROUND OF THE INVENTION

Sodium ion batteries (NIBs, NABs, SIBs) are primarily an alternative to lithium ion batteries (LIBs) for stationary and municipal applications, where system cost may trump energy density per se. However, with the emergence of new electrode materials and new electrolyte additives, there is the possibility for NIBs to match LIBs in performance as well. Hybrid ion capacitors (HICs) are attracting increasing scientific attention since they promise to span the divide between batteries and supercapacitors. A sodium ion capacitor (NIC) is a hybrid device employing Na-ions as the positive charge carriers. Overall the NIC field is quite young, with the first known device being published only several years ago.

Sodium ion anode candidate materials include a range of carbons, titanium based compounds, metals/alloy, oxides and sulfides. Carbon is perhaps one of the more attractive candidates based on its cost, environmental benignness, and the fact that a carbon-based anode is already the standard for commercial LIBs. While Na does not intercalate reversibly into graphite, a range of non-graphitic carbons have been developed instead. Pyrolyzed glucose derived hollow carbon spheres, biomass derived carbon nanosheets, polyaniline derived hollow carbon tubes, and functionalized graphene, functionalized high-surface-area nanocellular carbon foams etc. have been prepared and tested for Na ion storage with different voltage windows.

Nitrogen heteroatoms are well known to provide additional charge storage capacity through reversible binding of the Li (i.e., for LIBs) to the N-based moieties and/or associated defects in the carbons. Oxygen functional groups on the carbon surface are known to provide extra reversible capacity, especially in the high voltage region (1.5-4.5 V vs. Li/Li+). Recently, researchers have demonstrated that the heteroatom (N, O, S, F) functionalization strategy will also work for Na-ion storage. Materials such as nitrogen functionalized carbon nanofiber webs and oxygen functionalized carbon nanosheets were prepared and tested in various Na-ion based energy storage devices.

Nanoporosity is important for high-rate performance of NIB anodes in general. Open porosity is necessary to minimize the solid-state diffusion distances of the Na, by reducing the effective cross-section of the material. Pores also add short circuit paths for Na surface diffusion. With pyrolysis-derived carbons, it is a major challenge to achieve a high surface area while preserving substantial heteroatom content. The high temperatures employed for localized carbon gasification to create the nanopores lead to concomitant elimination of heteroatoms. Instead, hard templating strategies are used to introduce surface areas in the range of 400-800 $m^2g^{-1}$, with the maximum preservation of the heteroatoms. These are relatively complex synthesis methods, which are challenging to implement beyond the laboratory scale. Conversely, standard chemical activation such as by KOH, will significantly eliminate the surface heteroatoms (especially nitrogen) during the process. A scalable and facile methodology to synthesize carbons with high heteroatom content and high levels of nanoporosity remains an essential challenge.

SUMMARY OF THE INVENTION

Accordingly, it is an object of the present invention to overcome the challenges in the prior art. It is a further object of the present invention to provide an activated carbon with increased surface areas and maximum retention of heteroatoms, methods of making the same, and energy storage devices employing the carbon. The carbon according the present invention may be used in electrodes, including anodes and cathodes, in a variety of energy storage devices, including sodium and lithium ion batteries and capacitors, and may be embodied a number of different structures and forms, such as carbon nanosheets.

One embodiment of the present invention includes a unique carbon framework derived from a nitrogen rich precursor, such as polypyrrole (PPy) hydrogel precursor. Embodiments of the present invention further include a method and process in which the polypyrrole hydrogel is used as the precursor along with concurrent pyrolysis/$ZnCl_2$-induced activation.

In one embodiment, an electrode is fabricated from an activated carbon material, including a nitrogen content of at least 4 wt %, an oxygen content of at least 8 wt %, a surface area greater than 800 $m2g^{-1}$, and a reversible capacity of at least 279 $mAhg^{-1}$. In some embodiments the oxygen, nitrogen and other heteroatom content is lower. In other embodiments the heteroatom content is near trace levels. In some embodiments, a polypyrrole hydrogel precursor is used to create the activated carbon material. The nitrogen content may be at least about 13 wt % nitrogen and oxygen content at least about 11 wt %. In one embodiment, the surface area is about 945 $m^2 g^{-1}$. In some embodiments, the surface area is approximately equally divided between micropores and mesopores (e.g., such as at least 40% each).

The activated carbon, termed NOFC (N and O Functionalized Carbon), exhibits unparalleled storage capacity and rate performance, allowing the creation of energy storage devices with world-class energy-power characteristics. NOFCs rely on reversible ion adsorption at copious sites, yielding a superior NIB anode in terms of its reversible capacity, Coulombic efficiency, rate capability, and cyclability. Hybrid Na ion capacitors with these carbons offer performance on par with some of the best hybrid lithium ion capacitors.

In an exemplary embodiment, the present invention provides an energy storage device including an anode and a cathode with at least one of the anode and the cathode including the nitrogen and oxygen functionalized carbon (NOFC). The NOFC has a nitrogen content greater than 4 wt %, an oxygen content greater than 8 wt %, and a surface area greater than 800 $m^2 g^{-1}$. In some embodiments, the nitrogen content is greater than 8 wt % (e.g., 13 wt %) and the oxygen content is greater than 11 wt %. The energy storage device may be, for example, a sodium ion capacitor (NIC, HIC) or a lithium ion capacitor (LIC).

A sodium ion capacitor (NIC, HIC) electrode according to an exemplary embodiment of the present invention, fabricated from NOFC, has tremendous reversible capacity and rate capability. In one embodiment, 437 mAh $g^{-1}$ at 100 mA $g^{-1}$ and 185 mAh $g^{-1}$ at 1600 mA $g^{-1}$ is achieved. This is among the most favorable reported, and is due to copious nanoporosity that enables fast ion sorption at the many N and O moieties and graphene defects. The NOFC imbues a NIC device with energy-power characteristics that are not only state-of-the-art for Na hybrids, but also rival Li systems. In an exemplary embodiment, Ragone chart placement is 111 Wh kg$^{-1}$ and 38 Wh kg$^{-1}$ at 67 W kg$^{-1}$ and 14,550 W kg$^{-1}$, respectively, with 90% capacity retention at over 5,000 charge/discharge cycles.

The present invention further provides a method of preparing an activated carbon, including steps of carbonizing a polypyrrole hydrogel precursor and simultaneously activating the polypyrrole hydrogel using an activation agent, wherein the carbonization and activation are performed at a temperature of between about 450 C and about 950 C. In some embodiments, the activating agent is $ZnCl_2$. The resulting activated carbon has a nitrogen content of at least 4 wt % and an oxygen content of at least 8 wt %, such as 13 wt % nitrogen and 11 wt % oxygen. The resulting activated carbon may also have at least 40% mesoporosity and at least 40% microporosity, or at least 50% mesoporosity. The resulting activated carbon may also have a surface area greater than 800 m$^2$ g$^{-1}$, such as 945 m$^2$ g$^{-1}$.

Other objects of the invention and its particular features and advantages will become more apparent from consideration of the following drawings and accompanying detailed description.

DETAILED DESCRIPTION OF THE INVENTION

Figure 1A:
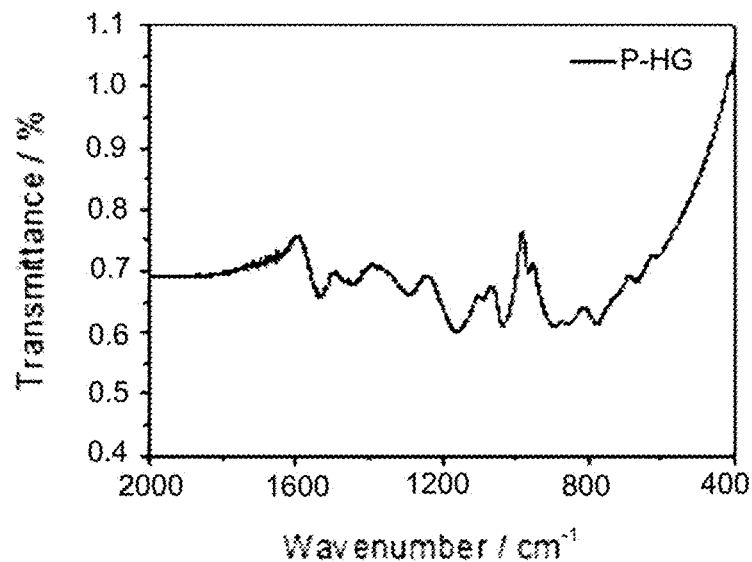
FIG. 1A illustrates infrared spectra of a polypyrrole precursor.
Figure 1B:
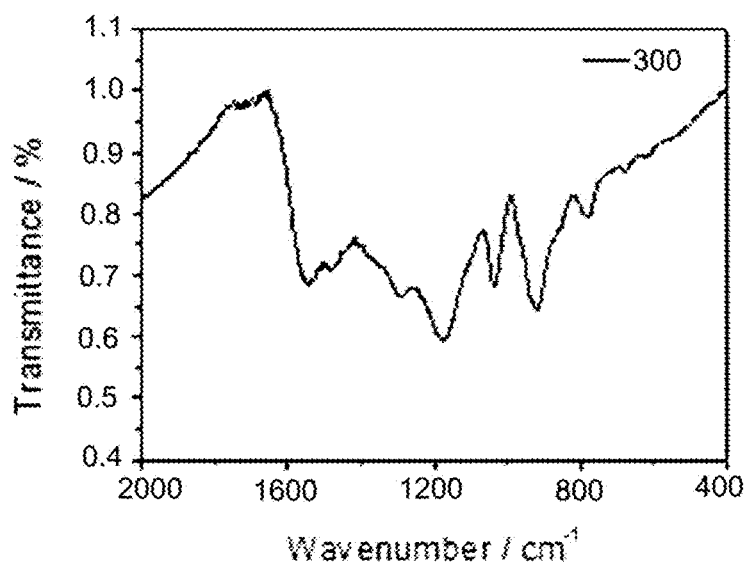
FIG. 1B illustrates infrared spectra of NOFC-300.
Figure 1C:
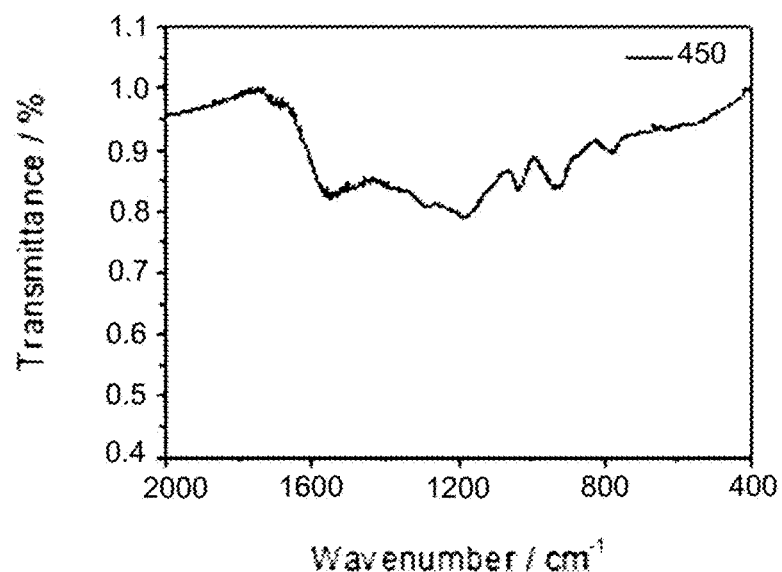
FIG. 1C illustrates infrared spectra of NOFC-450.
Figure 1D:
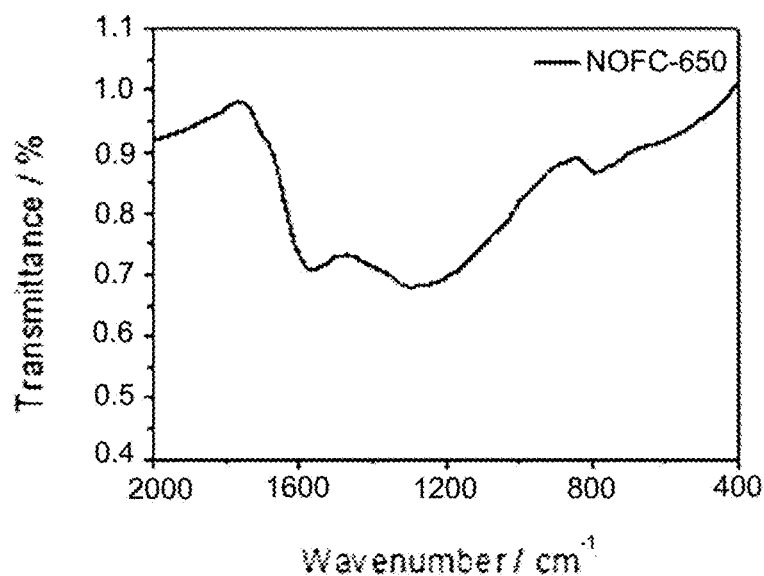
FIG. 1D illustrates infrared spectra of NOFC-650.

The present invention includes a unique carbon framework derived from a precursor, such as polypyrrole hydrogel precursor, and energy storage devices employing the same. The energy storage devices may include, for example, batteries and capacitors such as sodium ion batteries and capacitors, lithium ion batteries and capacitors, and ultracapacitors (e.g., supercapacitors, electrochemical capacitors), and hybrid ion capacitors. The energy storage device may have various form factors including, but not limited to, a D-cell battery, a pouch cell, a rectangular automotive starter battery scale cell, a C-cell sized battery, an AA-cell sized battery, an AAA-cell sized battery, a 18650 lithium ion battery, or a 26650 lithium ion battery. The present invention further provides a facile and scalable process to create a unique carbon framework from a precursor. The carbon may be embodied in a number of different structures and forms, such as carbon nanosheets, nanoflakes, microsheet carbons, carbons with graphene-like morphology, and carbons with various 2D morphologies such that their lateral to thickness dimensions ratio is greater than 10.

The activated carbon according the exemplary embodiment have a high surface area with a high heteroatom content to achieve exceptional results, particularly nitrogen and oxygen, and/or in some embodiments phosphorus (P), sulfur (S), fluorine (F), and boron (B). As one skilled in the art will understand, references herein to surface area generally mean specific surface area defined as the total surface area of a material per unit of mass. In the exemplary embodiment, the precursor is a polypyrrole (PPy) hydrogel precursor, though other precursors may be used to achieve the present invention.

The precursor, may be, or may include, any carbon-rich precursor material, such as, a hydrogel, an aerogel, a plant-based precursor material, a fossil-fuel precursor material, industrial or research-grade polymer precursor material, an organic solution precursor material, a waste product precursor material, a biological tissue precursor material, a metal organic framework precursor material, a petrochemical, a biomaterial, and a carbon-containing synthetic precursor material. For example, in some embodiments, the precursor may be, or may include, hemp products, such as hemp hurd or hemp fiber. In other embodiments, the precursor may be peanut materials, such as peanut shells or skins. In some embodiments, the precursor may be, or may include an industrial or research-grade polymer precursor material such as phenolic resin, polyvinylidene fluoride, polyacrylonitrile, polyethyleneterephthalate or the like. Other precursors such, petroleum products, jut, flax, ramie and other fibrous plant tissue, wood and forestry products, and biowaste materials may also be employed.

In an exemplary embodiment, the polypyrrole hydrogel precursor is used as a nitrogen rich precursor to create a carbon framework that possesses both high heteroatom content (e.g., 13 wt % nitrogen and 11 wt % oxygen) and high surface area (e.g., 945 $m^2$ $g^{-1}$) that is approximately equally divided between micropores and mesopores. Microporosity generally refers to a pore size that is less than 2 nm, and a mesoporosity has a pore size within a range of about 2 nm to about 50 nm.

Polypyrrole (PPy) has been employed as a precursor for preparing N-containing carbons due to its high starting nitrogen content (~16 wt %). Yet because of the significant heteroatom loss during the high temperature pyrolysis and chemical activation, the final carbons derived from PPy are generally not that N-rich. The typical N content of the resultant carbons is below 8 wt. %, which is promising, but with room for further improvement.

In order to achieve optimum Na-ion storage capability, the present invention aims to generate high levels of nanoporosity while simultaneously preserving the N and O content of the precursor. In some embodiments, this may be achieved by minimizing (relative to previous studies) the temperature and time at which carbonization/activation is performed. In some embodiments of the invention, the polypyrrole hydrogel precursor is used along with concurrent pyrolysis/$ZnCl_2$-induced activation. $ZnCl_2$ is less aggressive in eliminating heteroatoms than other systems such as KOH.

$ZnCl_2$ melts at 283° C. and boils at 730° C. It is the above its boiling point that $ZnCl_2$ is the most aggressive dehydrating agent, removing H, O as well as other heteroatoms. For low temperature $ZnCl_2$ activation, most of the pores are rather created by a process where molten $ZnCl_2$ penetrates the carbon and is subsequently removed during cleaning using acids such as HCl. Conversely KOH activation is achieved through the selective formation of $K_2CO_3$ and $K_2O$ in the less stable regions of the carbon, followed by their further reaction with the carbon to form metallic K and CO. Since surface moieties, in addition to the amorphous regions, are less stable than the more pure and more ordered portions of the carbon, heteroatoms are preferentially eliminated.

In the exemplary embodiment, carbonization and $ZnCl_2$-catalyzed activation is done simultaneously in order to further minimize N and O loss by reducing the total time at high temperature. In exemplary embodiments, the treatment is performed at temperatures of 650° C., 800° C. or 950° C. for 1.5 hours. These examples are labeled as NOFC-650, NOFC-800, and NOFC-950.

Preliminary work at lower temperatures showed that the specimens did not carbonize sufficiently. As shown in infrared spectra (FIGS. 1A-1D), the P-HG precursor exhibits well-defined peaks that are characteristic of PPy. After carbonization at low temperatures (i.e. 300° C. and 450° C.), the PPy characteristic peaks started to diminish, however still could be identified, which indicated the minimal degree of carbonization. The spectrum of the fully carbonized NOFC-650 specimen exhibited broad bands due to the strong absorption of carbon, with total elimination of the PPy characteristic peaks. A state-of-the-art supercapacitor electrode-grade commercial activated carbon was employed as a baseline. The material is NORIT A SUPRA and is labeled AC.

Figure 2A:
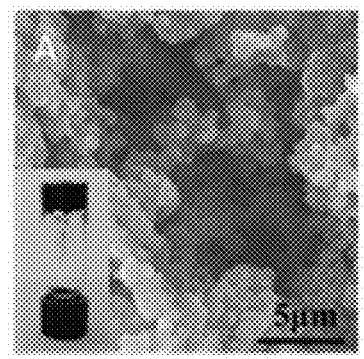
FIG. 2A is a SEM micrograph of a polypyrrole precursor and a digital image of a PPy hydrogel.
Figure 2B:
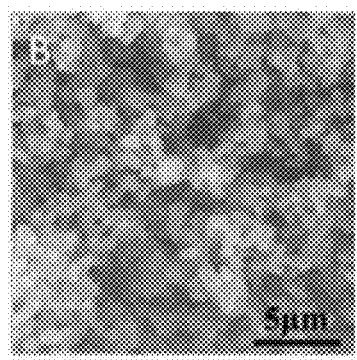
FIG. 2B is a SEM micrograph of NOFC-650.
Figure 3A:
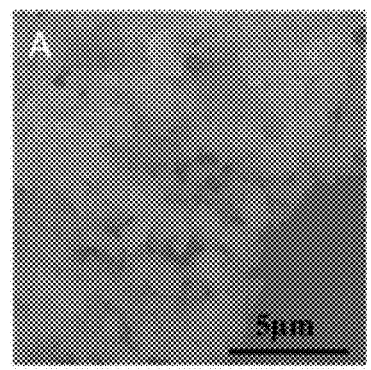
FIG. 3A is a SEM micrograph of NOFC-800.
Figure 3B:
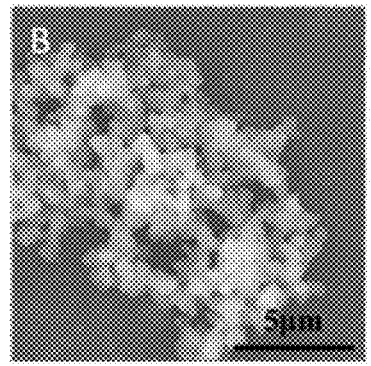
FIG. 3B is a SEM micrograph of NOFC-950.
Figure 3C:
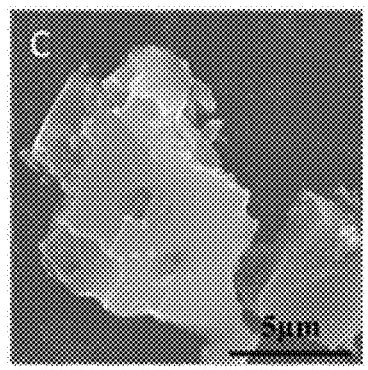
FIG. 3C is a SEM micrograph of AC.

FIG. 2A shows a representative scanning electron microscopy (SEM) micrograph of the P-HG precursor after freeze drying. Due to the crosslinking effect of phytic acid molecule during polymerization, the obtained polymer is a three-dimensional network of interconnected granules. FIG. 2B and FIG. 3A-B show micrographs of NOFC-650, NOFC-800, NOFC-950, respectively. Basically, the NOFCs of the present invention inherit the architecture of P-HG but with shrinkage of the granule size. The AC baseline (shown in FIG. 3C) consists irregular-shaped particles that are tens of micrometers in diameter.

Figure 2C:
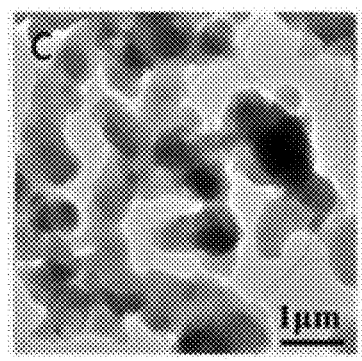
FIG. 2C is a TEM micrograph of NOFC-650.
Figure 2D:
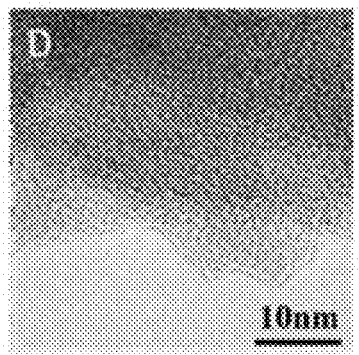
FIG. 2D is a HRTEM micrograph of NOFC-650.
Figure 2E:
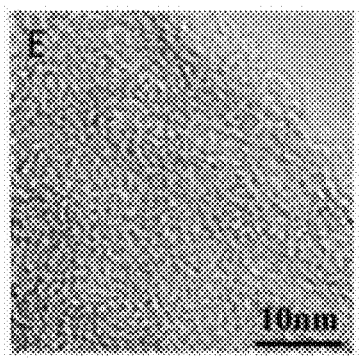
FIG. 2E is a HRTEM micrograph of NOFC-800.
Figure 2F:
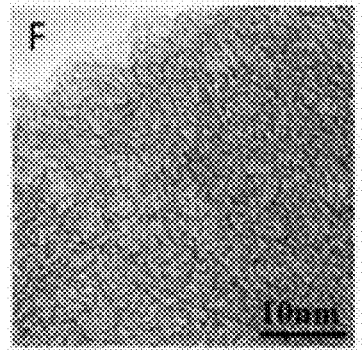
FIG. 2F is a HRTEM micrograph of NOFC-950.
Figure 3D:
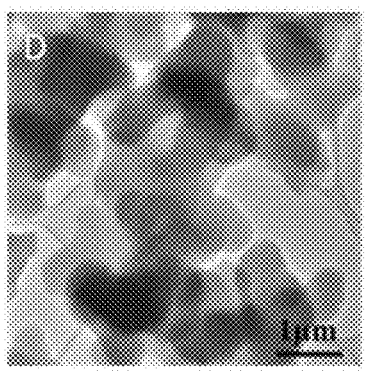
FIG. 3D is a TEM micrograph of NOFC-800.
Figure 3E:
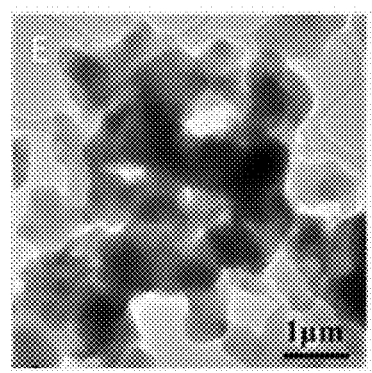
FIG. 3E is a TEM micrograph of NOFC-950.

FIG. 2C is a transmission electron microscopy (TEM) micrograph of NOFC-650, which highlights the interconnected carbon granules interspersed with macroporosity. As shown in FIG. 3D-E, the other NOFC specimens possess an analogous interconnected-porous morphology. FIGS. 2D-1F are high resolution TEM (HRTEM) micrographs which demonstrate that with increasing carbonization temperature, the carbons becomes progressively more ordered in terms of possessing aligned domains of defective graphene planes. However, none of the three carbons show the presence of equilibrium graphite.

Figure 4A:
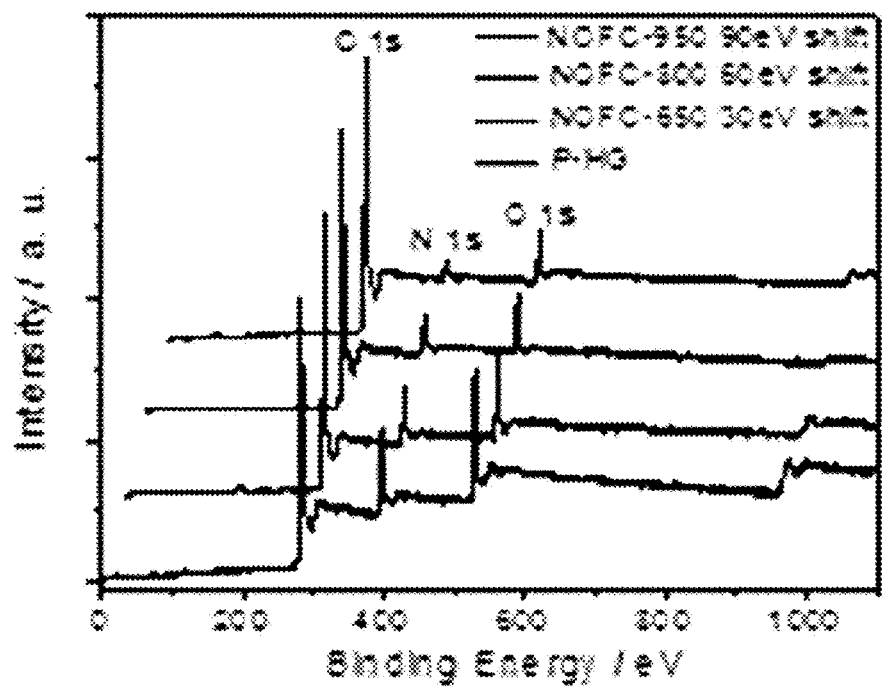
FIG. 4A is an XPS survey spectra of NOFC-650, NOF-800, and NOFC-950.

FIG. 4A shows survey spectra of the surface chemistry of P-HG and NOFCs investigated by X-ray photoelectron spectroscopy (XPS). All three carbons are primarily composed of C, N and O, with any impurity elements (e.g., Cl) being lower than 0.5 wt %. As shown in Table 1A below, the P-HG precursor has a N content of 15.8 wt % and O content of 18.62 wt %. After the carbonization/activation treatment at 650° C., a large portion of heteroatoms is retained, with 13.39 wt % N and 11.32 wt % O. The N content for NOFC-650 is among the highest reported for any high surface area carbon. As shown in Tables 1A and 1B below, the treatment temperature is an important factor in determining the total heteroatom content and the ratios of various nitrogen/oxygen moieties. With higher temperature, the heteroatom content decreased. Comparing to NOFCs, the AC baseline has only 4.65 wt % oxygen and negligible nitrogen.

TABLE 1A

| | $d_{002}$ (Å) | $I_G/I_D$ | $S_{BET}$ (m² g⁻¹) | $V_t$ (cm³ g⁻¹) | Pore Vol (%) | | Elemental Analysis (XPS) | | |
|---|---|---|---|---|---|---|---|---|---|
| | | | | | Micro-pore | Meso-pore | C (wt %) | N (wt %) | O (wt %) |
| P-HG | — | — | — | — | — | — | 65.58 | 15.80 | 18.62 |
| NOFC-650 | 3.67 | 1.04 | 905 | 1.09 | 57 | 43 | 75.29 | 13.39 | 11.32 |
| NOFC-800 | 3.65 | 1.09 | 945 | 0.97 | 49 | 51 | 82.72 | 8.24 | 9.04 |
| NOFC-950 | 3.62 | 1.21 | 867 | 0.93 | 41 | 59 | 86.30 | 4.93 | 8.77 |
| AC | 3.72 | 0.26 | 2050 | 1.17 | 62 | 38 | 95.35 | ~0 | 4.65 |

TABLE 1B

| | % of total N 1 s | | | | % of total O 1 s | | | C |
|---|---|---|---|---|---|---|---|---|
| | N-X | N-Q | N-5 | N-6 | O-I | O-II | O-III | (mA hg−1) |
| P-HG | 0 | 0 | 100 | 0 | 37.79 | 62.21 | 0 | — |
| NOFC-650 | 11.05 | 12.81 | 43.90 | 32.24 | 56.18 | 40.41 | 4.43 | 437 |
| NOFC-800 | 8.53 | 34.62 | 25.30 | 31.55 | 50.77 | 44.80 | 4.18 | 388 |
| NOFC-950 | 15.65 | 45.82 | 11.40 | 27.23 | 48.23 | 47.59 | 3.41 | 279 |
| AC | — | — | — | — | 43.52 | 49.95 | 6.52 | 90 |

Figure 4D:
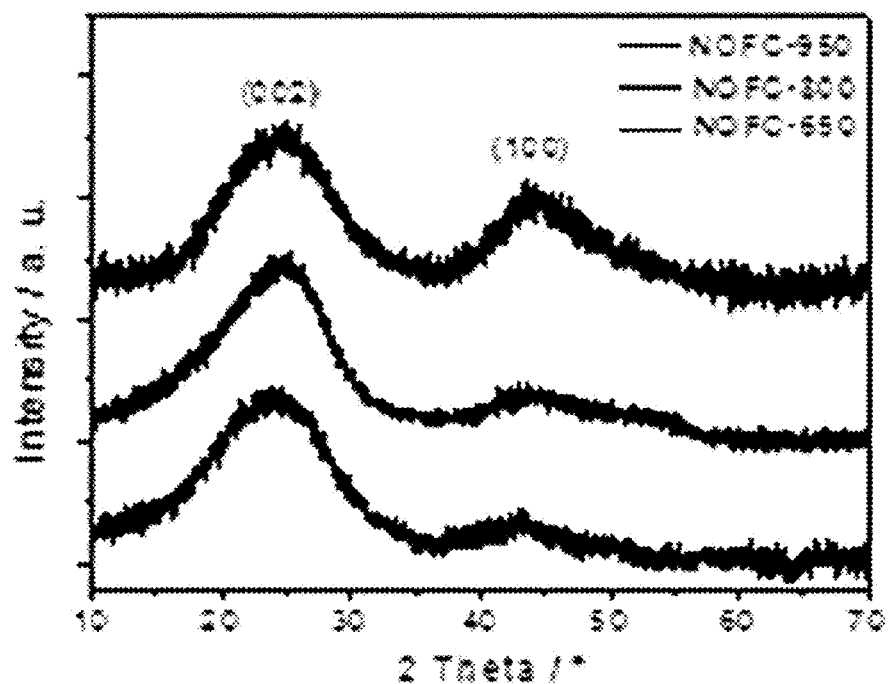
FIG. 4D illustrates XRD patterns of the NOFC specimens.
Figure 4B:
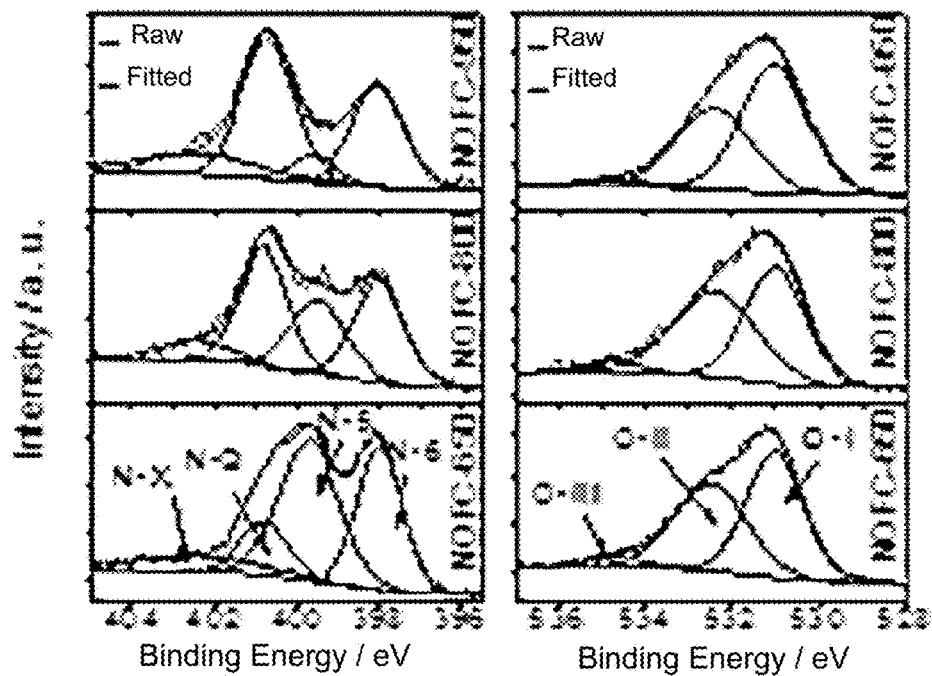
FIG. 4B is an N 1s and O 1s core level XPS high resolution spectra with fits for NOFC specimens.
Figure 5A:
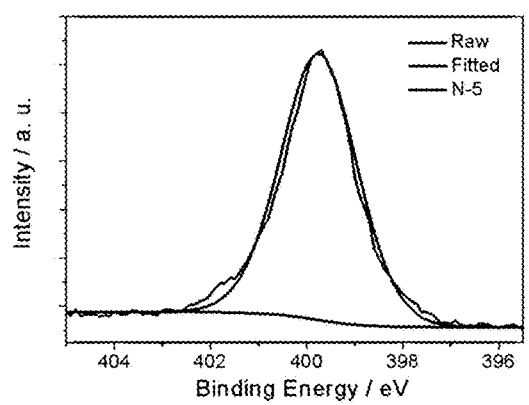
FIGS. 5A-5B show N 1s and O 1s core level XPS high resolution spectra, respectively, with fits for P-HG.
Figure 5B:
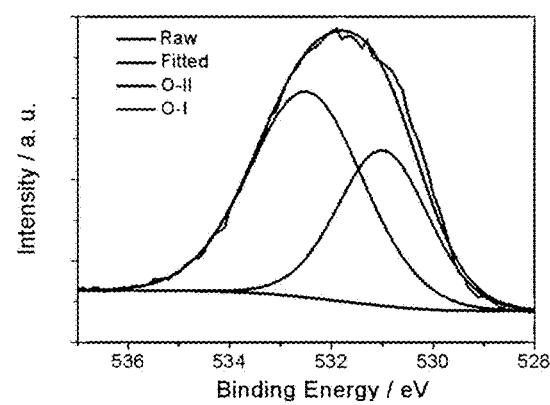

FIG. 4B shows high-resolution N 1s and O 1s core level XPS spectra of NOFCs and FIG. 5A-5B show high-resolution N 1s and O 1s core level XPS spectra of the P-HG precursor. FIG. 5A indicates that P-HG has only one pyrrolic (N-5) peak at 399.7 eV ascribed to N atoms within the pentagonal pyrrole ring. As shown in FIG. 4B, NOFCs contain additional species; pyridinic N (N-6 at binding energy i.e. B.E. 398 eV), quaternary N (N-Q at B.E. 400 eV) and oxidized N (N—X at B.E. 402.5 eV). Such a distribution of moieties qualitatively agrees with a report on pyrolized polypyrrole.

Table 1B lists the percentage of each N species for all the carbons. NOFC-650 possesses the highest proportion of pyrrolic N (43.9 wt %), with increasing treatment temperature promoting quaternary N instead. A similar trend has been reported for various N containing carbons synthesized at differing temperatures. The growth of the graphene layers at the higher carbonization temperature may be the cause of proportionally more N atoms being located at center positions of the lattice, i.e., as N-Q. With increasing temperature the amount of pyridinic N relative to quaternary N is also reduced, albeit at a slower rate. This may be due to its greater stability as compared to pyrrolic N.

The O 1s core level spectra of NOFCs could be deconvoluted into three peaks ascribed to different O functionalities: C=O/O—C=O (O—I at B.E. 531 eV), C—OH/C—O—C (O—II at B.E. 532.4 eV) and COOH (O—III at B.E. 535.4 eV). For all NOFCs, O—I and O—II are the primary O groups, with O—III being the minority (<4.5 wt %). As shown in Table 1B, with increasing temperature the proportion of O—II increased at the expense of O—I, which is due to the known higher thermal stability of the former. All three NOFCs have low content of O—III, with the percentage below 5%. Most of the oxygen groups in AC are O—II type.

Figure 4E:
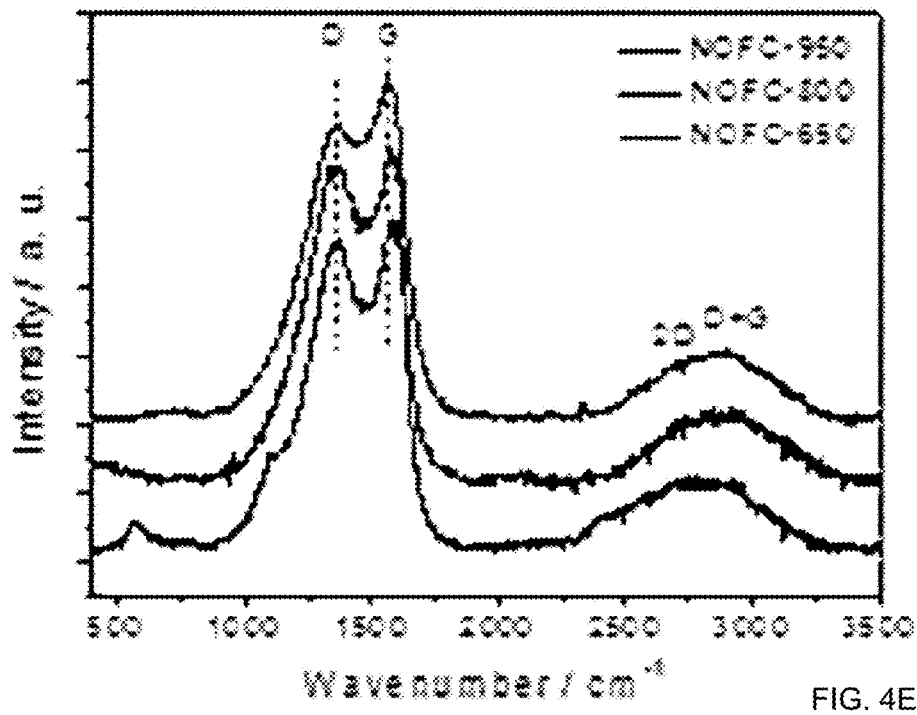
FIG. 4E illustrates Raman spectra of the NOFCs.
Figure 4C:
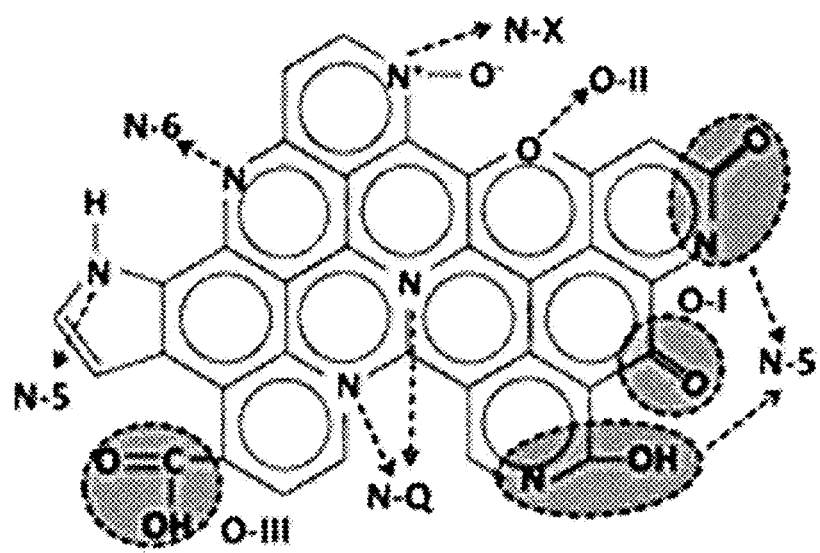
FIG. 4C is a schematic illustrating structure of the N-, O-functionalities in NOFC.

The structure of the N and O functional groups are illustrated in FIG. 4C. The N-5 and N-6 groups are typically sitting on an edge site of the aromatic rings. The N-5 and N-6 moieties should be highly chemically active, and are likely to introduce additional defects into the graphene planes. Such moieties and associated defects will enhance graphene's capacity to reversibly bind with charge carriers such as Na and Li, as compared to the more inert N-Q. For the oxygen functional groups, it is expected that O—I is the most reactive species due to its unsaturated quinone bond.

FIG. 4D illustrates the structure of NOFCs according to an exemplary embodiment of the present invention characterized by X-ray diffraction (XRD). All the XRD patterns had two broad diffraction peaks, which may be indexed as (002) and (100). According to the center position of (002) peaks, the average graphene interlayer spacing are 3.67, 3.65, 3.62 Å for NOFC-650, NOFC-800, NOFC-950, respectively. These mean interlayer spacings are 9.4%, 8.8%, and 7.9% larger than the equilibrium spacing for graphite, which is c/2 i.e. 3.354 Å. A dilated interlayer spacing is an important prerequisite for reversible Na ion intercalation into carbon. However as demonstrated by sloping shape of the galvanostatic charge-discharge curves, and the lack of a graphite-like low voltage plateau, Na intercalation into NOFCs does not appear to a major contributor to the overall capacity. Some Na ion intercalation will be present, contributing to what capacity is observed at low voltages. In carbons where reversible intergraphene layer intercalation of the Na did dominate the capacity profiles, the graphene planes were dilated by as much as 19%.

FIG. 4E illustrates the NOFCs structure investigated by Raman spectroscopy. The intensity ratio of the in-plane vibrational G-band at ~1570 cm⁻¹ and disorder-induced D-band at ~1357 cm⁻¹ is an indicator of the degree of graphitic ordering, being is termed $I_G/I_D$. Intensity of the bands is obtained from the absolute heights of the peaks in the Raman spectra.

As shown in Table 1A, the value of $I_G/I_D$ of NOFCs increased with higher synthesis temperature, with all the NOFCs having much higher $I_G/I_D$ than AC. It also should be noted that the broad hump at 2700-3000 cm$^{-1}$ ascribed the second order 2D and D+G bands are also associated with carbon order. Overall the trends observed by Raman agree with the TEM and XRD results. The relatively large aligned graphene domains render NOFCs highly electrically conductive. This enhances their rate capability, especially once the materials are tested at the much higher power regimes needed for supercapacitors.

Figure 4F:
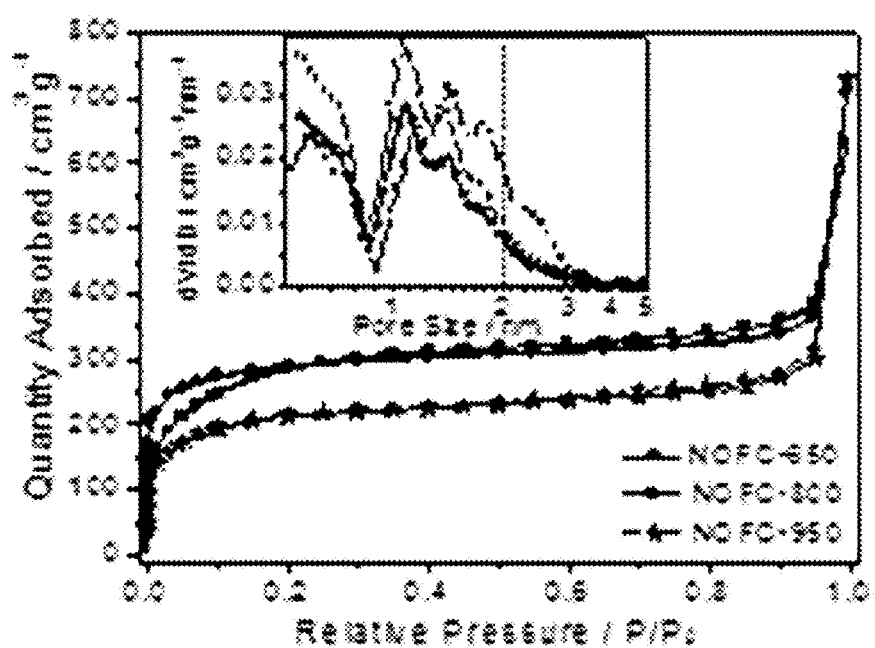
FIG. 4F illustrates Nitrogen adsorption-desorption isotherms of NOFCs according to the present invention and the related pore size distribution, calculated from the adsorption isotherms using DFT method.

The surface area and porous texture of NOFCs was analyzed by N2-adsorption at 77 K. FIG. 4F shows the nitrogen adsorption-desorption isotherms of NOFCs. The inserts in the figure highlight the corresponding pore size distributions, which were obtained by density functional theory (DFT). NOFCs exhibit type I/IV isotherms, with BET surface areas of 905, 945 and 867 m2g$^{-1}$ for NOFC-650, NOFC-800, NOFC-950, respectively (Table 1A). This indicates that temperature, in the range employed, has minimal effect on the resultant surface areas.

The active surface area of NOFC-650 is among the highest reported for carbons with similarly high heteroatom content. According to the pore size distribution, most of the pores produced by activation are smaller than 5 nm in diameter. This may add a Na metal underpotential deposition, aka nanopore filling, aka nanoplating, to the overall reversible charge storage capacity. However whether metallic Na plates out into nanopores is still to be fully established, with contrary results being reported.

Figure 6:
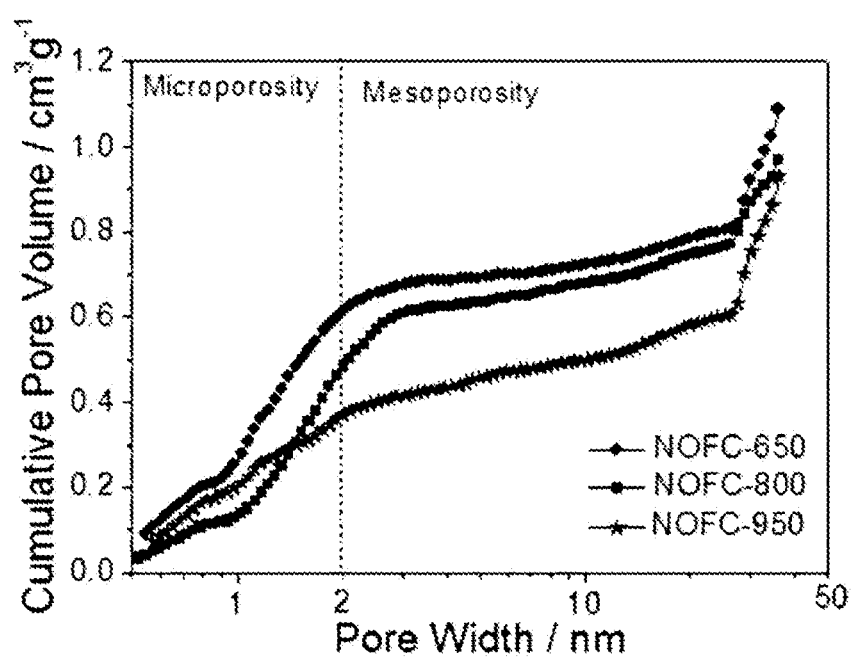
FIG. 6 shows cumulative pore volume of NOFC using DFT model.

As shown in Table 1A, with increasing temperature, the proportion of mesopores increases, which is due to the more intense attack/etching effect of $ZnCl_2$ at higher temperature. In the exemplary embodiment, NOFC-650 was found to have 43% of mesoporosity, while NOFC-950 had 59%. The detailed cumulative pore volumes as a function of pore size are show in FIG. 6. Such relative mesoporosity values are quite high as compared to previously reported chemically activated carbons that are generally more microporous. Applicant submits that for hybrid devices, likewise to conventional supercapacitors, mesoporosity is essential for providing high rate capability by reducing ion diffusional limitations within the electrolyte. Moreover, mesopores may be generally much more useful for NIB anode systems since at lower voltages micropores may become plugged with solid electrolyte interface (SEI) reduction products. The baseline AC has much higher surface area (2050 m$^2$g$^{-1}$) and pore volume (1.17 cm$_3$g$^{-1}$) than NOFCs. Despite the higher total porosity level, AC is a much less effective NIB anode due to its lower heteroatom content, lower degree of order, and overall "closed" macroscopic morphology (particles that are tens of micrometers in size) leading to ion transport limitations.

Figure 7:
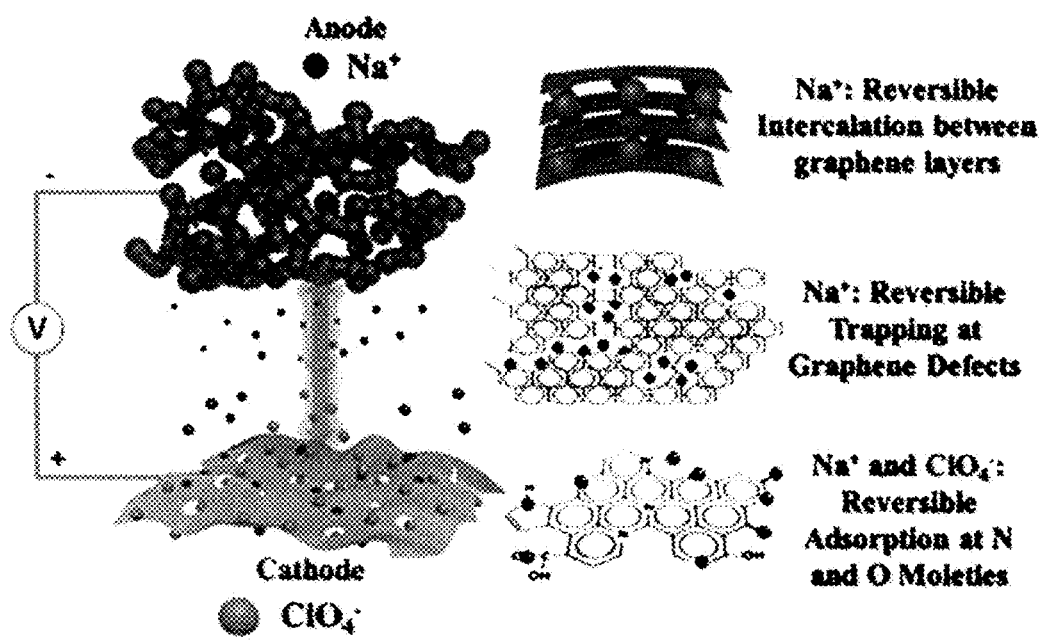
FIG. 7 illustrates the charge storage mechanisms for anode (NOFC) and cathode (PSNC) in a NOFC/PSNC sodium ion capacitor (NIC) device according to an embodiment of the present invention.

FIG. 7 illustrates the relevant charge storage mechanisms of NOFCs in the 1M $NaClO_4$ in 1:1 ethylene carbonate (EC):diethyl carbonate (DEC) electrolyte. In a half-cell, Na+ will be the primary charge carrier, whereas in a device the $ClO_4^-$ counterions would also contribute, especially on the positive electrode. Based on the NOFCs' N and O surface chemistry and partially ordered albeit non-graphitic structure, one expects several mechanisms to be operating throughout the voltage range: Reversible adsorption of Na+ and $ClO_4^-$ at the O and N functional groups and reversible adsorption of Na+ at graphene defects (e.g., divacancy, Stone-Wales) and edge sites should dominate. While Na+ may interact with the moieties to actually give reversible redox reactions, these are not established in literature. For Na+ with porous carbons, a capacity contribution due to metal underpotential deposition, aka nanopore filling, aka nanoplating, is also not well demonstrated. Thus, even qualitatively the behavior would not be analogous to heteroatom-rich carbons tested against Li, where metal pore filling is established. Due to insufficient dilation of the defective graphene layers, intercalation of Na+ will play only a limited role.

Figure 8A:
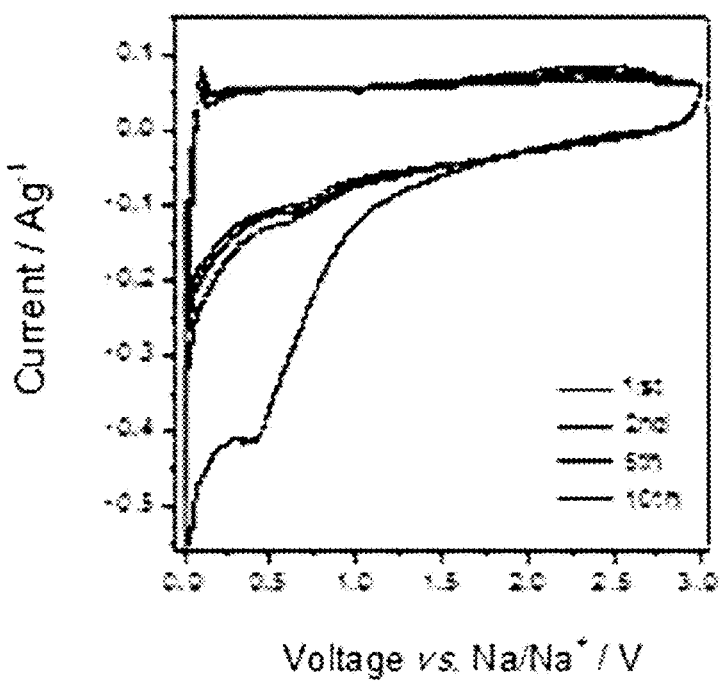
FIGS. 8A-8E show electrochemical performance of NOFC electrodes according to the present invention in half-cell configuration within the voltage window of 0.01-3 V vs. Na/Na+.
Figures 9A, 9B:
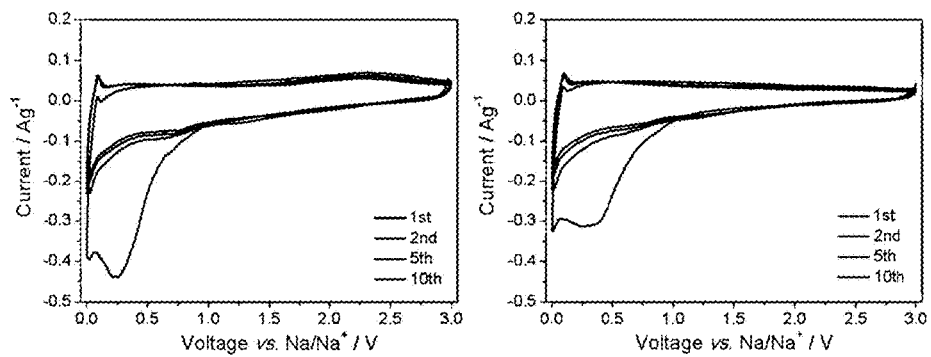
FIG. 9A shows a cyclic voltammogram (CV) of NOFC-800 tested at 0.1 mVs-1.
FIG. 9B shows a cyclic voltammogram (CV) of NOFC-950 tested at 0.1 mVs-1.

The Na storage behavior of NOFCs was firstly tested in half-cell configuration against metallic sodium, with working voltage window of 0.01-3V vs. Na/Na+. FIG. 8A and FIG. 9A-B shows the cyclic voltammetry (CV) curves of NOFC electrodes at a scan rate of 0.1 mVs$^{-1}$. The quasi-rectangular component of the CV curves, analogous to the electric double-layer capacitor (EDLC) behavior in classic supercapacitors, is indicative of the large surface area of the carbons available for reversible adsorption. The humps around 2.4V and 0.75V in the anodic and cathodic branches respectively may reflect one or several redox reactions, although their contribution to the total amount of charge stored is quite minor. During the first several cycles, the 0.75V redox peak also includes a contribution from SEI formation, which is known to occur around that voltage. Increasing the heat treatment temperature leads to a progressive reduction of the total charge measured in the CVs. As the largest effect of a higher pyrolysis/activation temperature is the elimination of N and O content (Tables 1A-1B), the importance of heteroatoms in determining the total reversible capacity is evident. As the adsorption energy of Na+ at the wide range of moieties and graphene defect is expected to vary, one may expect a quasi-monotonic variation of capacity with voltage.

Figure 8B:
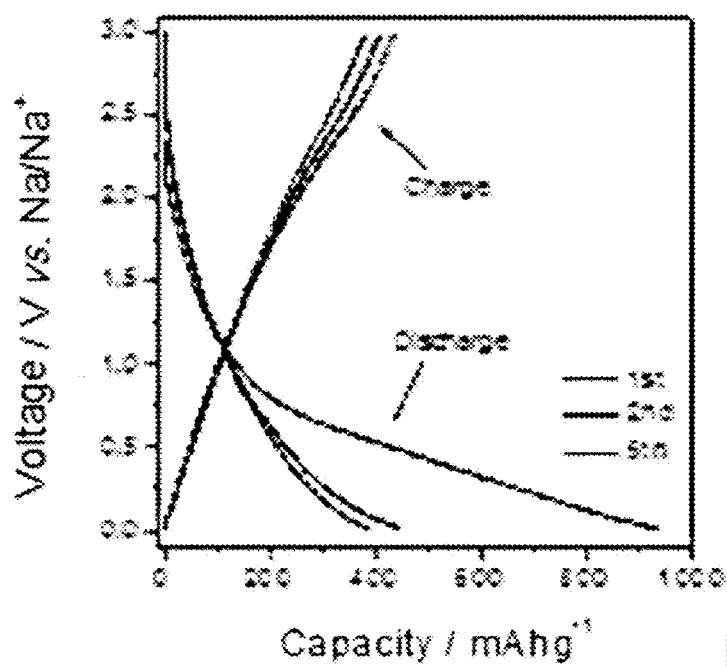
Figures 9C, 9D:
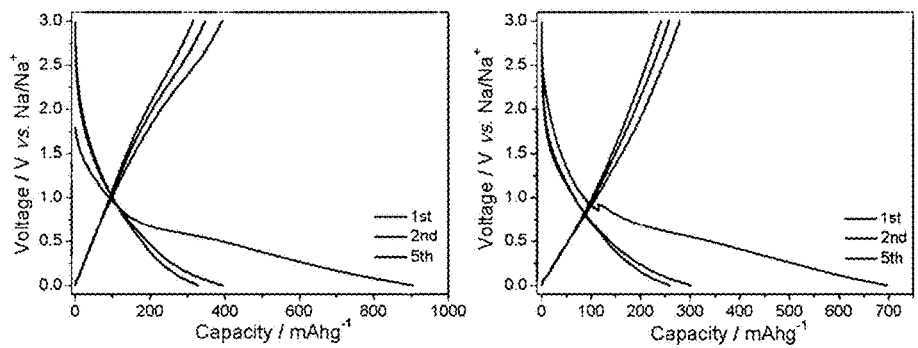
FIG. 9C shows a galvanostatic discharge/charge profile of NOFC-800 tested at 0.1 Ag-1.
FIG. 9D shows a galvanostatic discharge/charge profile of NOFC-950 tested at 0.1 Ag-1.

FIG. 8B and FIG. 9C-9D show the galvanostatic charge/discharge profiles of NOFC electrodes tested at current density of 0.1 Ag$^{-1}$. NOFC-650 delivered first discharge and charge capacities of 839 and 437 mAhg$^{-1}$, resulting in the 1st cycle Coulombic efficiency (CE) of 52%. The capacity loss is due to both surface SEI layer formation and irreversible trapping on Na within the bulk of the carbon. Whether or not the 48% loss would affect the net energy density in a device depends on its architecture. For instance, if a pristine NOFC electrode were to be paired against a conventional oxide-based Na ion cathode, the two would have to be loaded with a cathode to anode capacity ratio of roughly 1.5 to 1 in order to achieve balance during cycling. This would lead to a lower energy density due to the extra weight. However, in some embodiments of the hybrid devices according to the present invention, prior to assembly the NOFC electrodes are pre-activated by being galvanostatically cycled three times in a half-cell configuration. In this case, the initially low CE in a half-cell does not affect the device energy.

As shown in FIG. 9C-9D and Table 1B, at 0.1 Ag$^{-1}$ the reversible capacity of NOFC-800 and NOFC-950 is 388 mAhg$^{-1}$ and 279 mAhg$^{-1}$, respectively. As all three electrodes possessed on-par surface areas, the superior reversible capacity of NOFC-650 may be attributed to the highest content of N and O. The baseline AC delivered a reversible capacity of 90 mAhg$^{-1}$ at the 1st cycle, and degrade further with higher cycle numbers.

Figure 10:
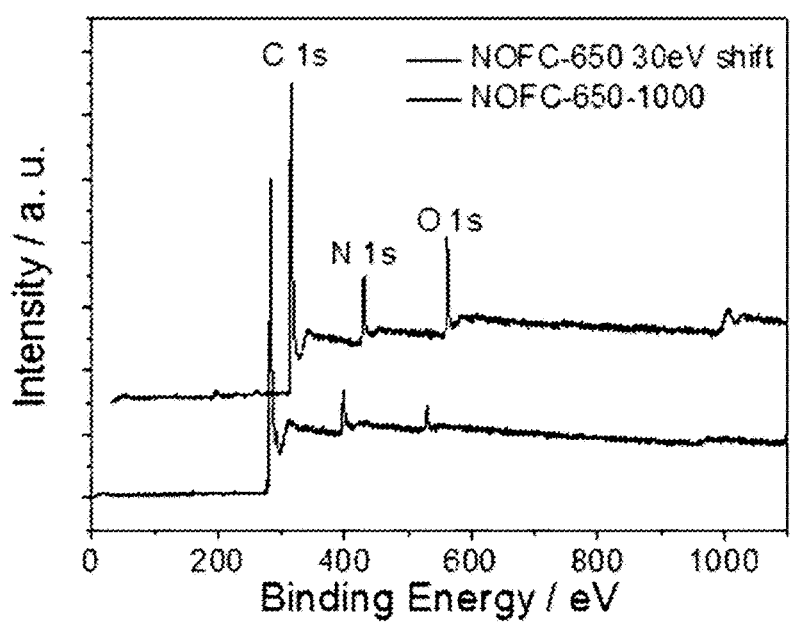
FIG. 10 shows XPS survey spectra of NOFC-650 and post-annealed NOFC-650-1000.
Figure 11A:
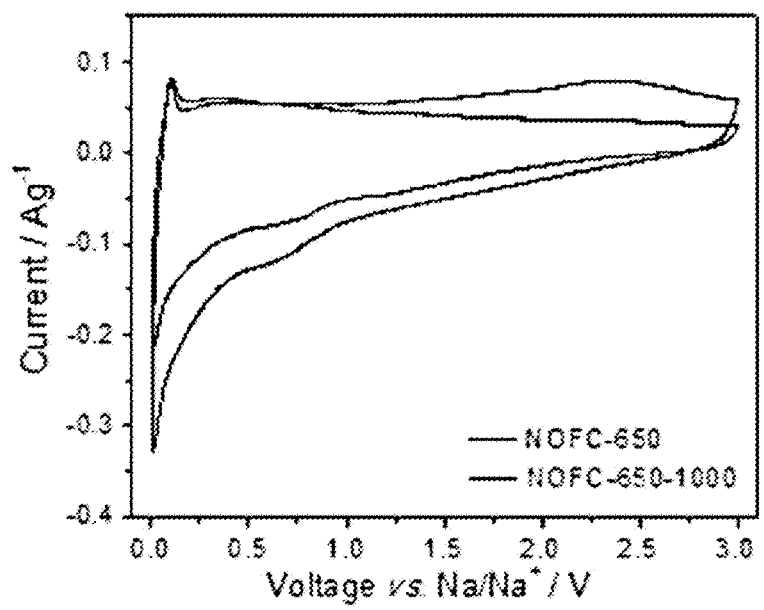
FIGS. 11A-11B show electrochemical performance of NOFC-650 before and after reducing the surface functionalities by annealing at 1000° C. in argon for 1 h, with FIG. 11A showing cyclic voltammograms at 0.1 mVs-1 (2nd cycle) and FIG. 11B showing specific capacities at various current densities.
Figure 11B:
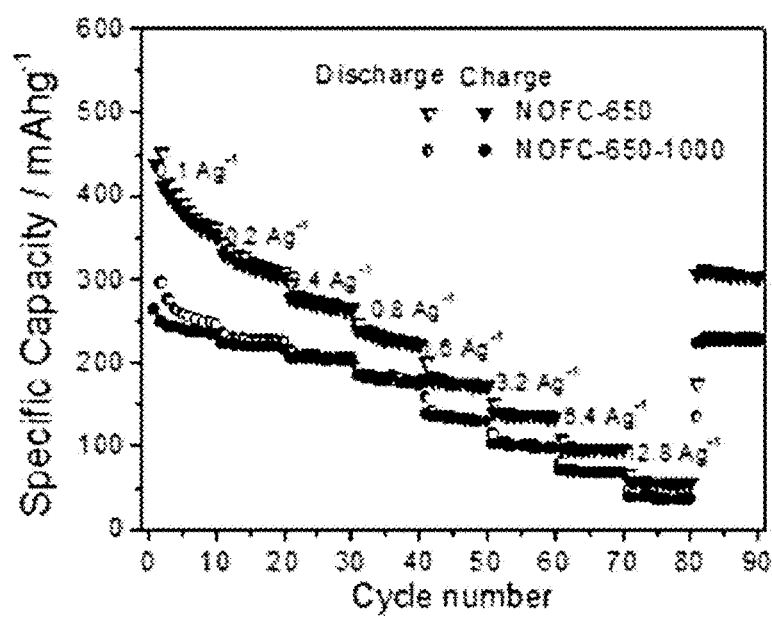

Applicant further investigated the role of O and N moieties in influencing the reversible sodium storage capacity. By annealing the NOFC-650 specimen at 1000° C. in argon (termed NOFC-650-1000), the N and O content was reduced. According to the XPS data (FIG. 10), the anneal decreases the N and O content from 13.39% to 7.01%, and from 11.32% to 4.53%, respectively. As may be seen from the comparison of the CVs for the annealed versus the baseline materials (FIG. 11), the total amount of charge is substantially decreased. Likewise, the reversible capacity is markedly reduced at all rates. For instance, 0.1 A/g the reversible capacity drops from 437 to 261 mAhg$^{-1}$, at 0.4 Ag$^{-1}$ the reversible capacity drops from 277 to 205 mAhg$^{-1}$, at 1.6 Ag$^{-1}$ the reversible capacity drops from 181 to 137 mAhg$^{-1}$, while at 6.4 Ag$^{-1}$ the reversible capacity drops from 97 to 69 mAhg$^{-1}$.

Figure 8C:
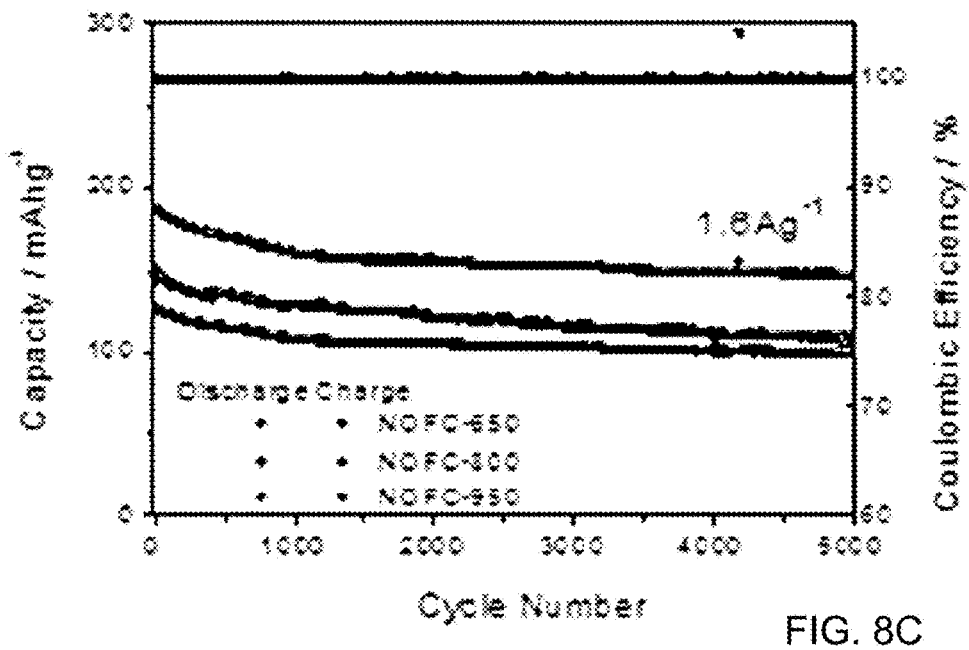
Figure 12A:
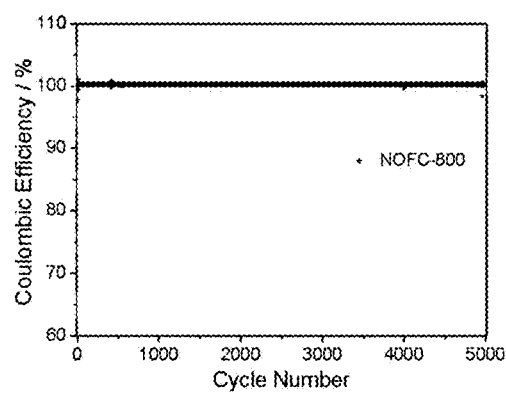
FIG. 12A shows coulombic efficiency of NOFC-800 during the cycling tests.
Figure 12B:
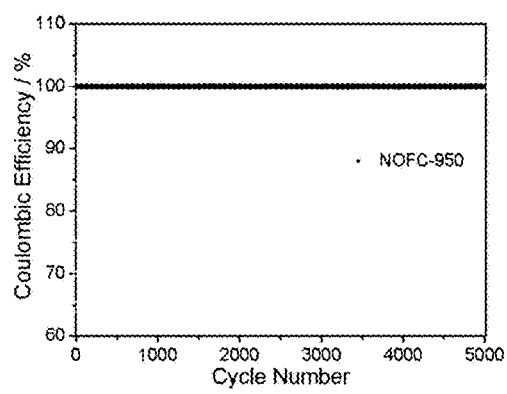
FIG. 12B shows coulombic efficiency of NOFC-950 during the cycling tests.

Since NIC electrodes are expected to operate at higher power than conventional NIB electrodes, the cycling stability of NOFCs was tested at ~4 C, i.e., 1.6 A g$^{-1}$. As shown in FIG. 8C, the NOFC electrodes underwent 5,000 full charge-discharge cycles with good capacity retention, i.e., 79%, 78% and 80% for NOFC-650, NOFC-800 and NOFC-950. The right axis of the figure displayed the Coulombic efficiency of NOFC-650, which stabilized at 100±0.7% during cycling. NOFC-800 and NOFC-950 electrodes displayed similarly excellent CE, as shown in FIG. 12. A capacity retention of roughly 80% is quite rare for research-grade anode materials that undergo charge to full capacity at every cycle. This is especially true considering the 39% higher Na diameter as compared to Li, which should lead to higher cycling "damage" of a given structure. NOFCs unique stability is likely intrinsically linked to the adsorption-based charge storage mechanisms that impose minimal volumetric change even when fully sodiated. Moreover, since adsorption will lead to minimal cracking or pulverization, there will not be much new carbon surface exposed to the electrolyte. Hence cycling CE will be close to 100% as little additional SEI will form during extended cycling (SEI growth is catalyzed on fresh carbon surfaces).

Figure 8E:
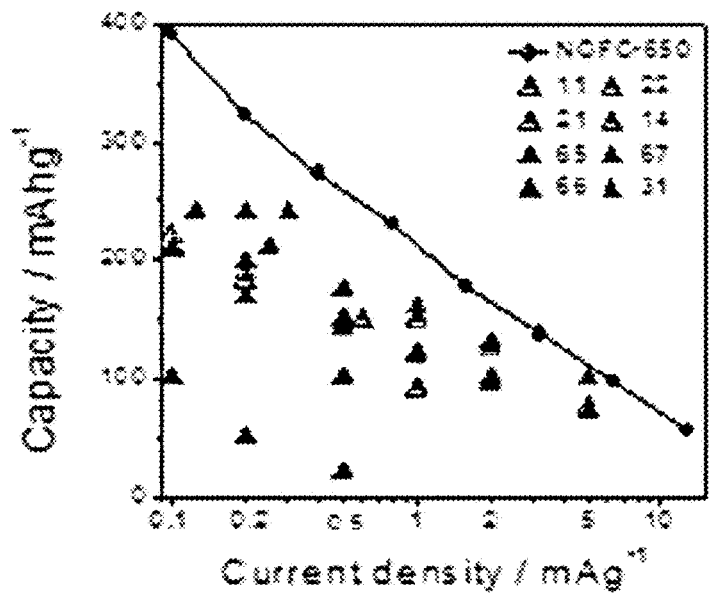
Figure 8D:
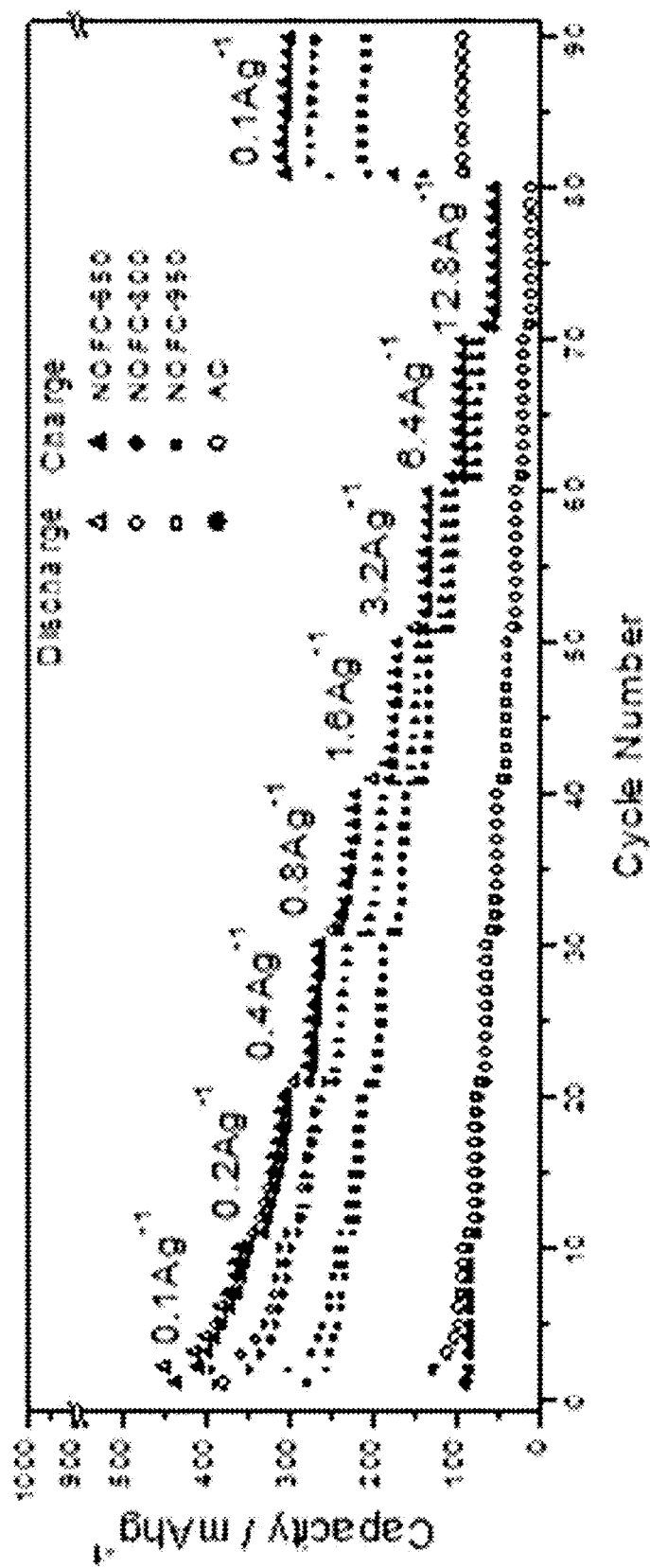

FIG. 8D shows the capacities of NOFC electrodes at various current densities. NOFC-650 is the best material at all the rates tested, exhibiting a specific capacity of 176, 136, and 96 mAhg$^{-1}$ at 1.6, 3.2 and 6.4 Ag$^{-1}$, respectively. Even at rate as high as 32 C (12.8 Ag$^{-1}$), there are still 56 mAhg$^{-1}$ retained. As indicated earlier, Applicant attributes the superior rate performance of NOFCs to their macroscopically open structure and high levels of mesoporosity. Combined, these two features minimize Na diffusional losses both within the liquid electrolyte and in solid-state, the latter due to a thinner effective cross-section of the carbon. FIG. 8E plots the capacity of NOFC-650 as function of current density, comparing the results to a range of state-of-the-art carbons from literature. The results cited included carbons with diverse levels of heteroatom functionalization and surface areas. All the carbon anodes from literature were tested in the same voltage range as NOFC-650, i.e. 0-3V vs. Na/Na+. NOFC-650 possessed among the highest functionalization levels reported (13.39 wt % N, 11.32 wt % O), in addition to the considerable surface area (905 m$^2$g$^{-1}$) and nanoporosity. Consequently, it exhibits superior capacity at all rates tested.

Figure 13:
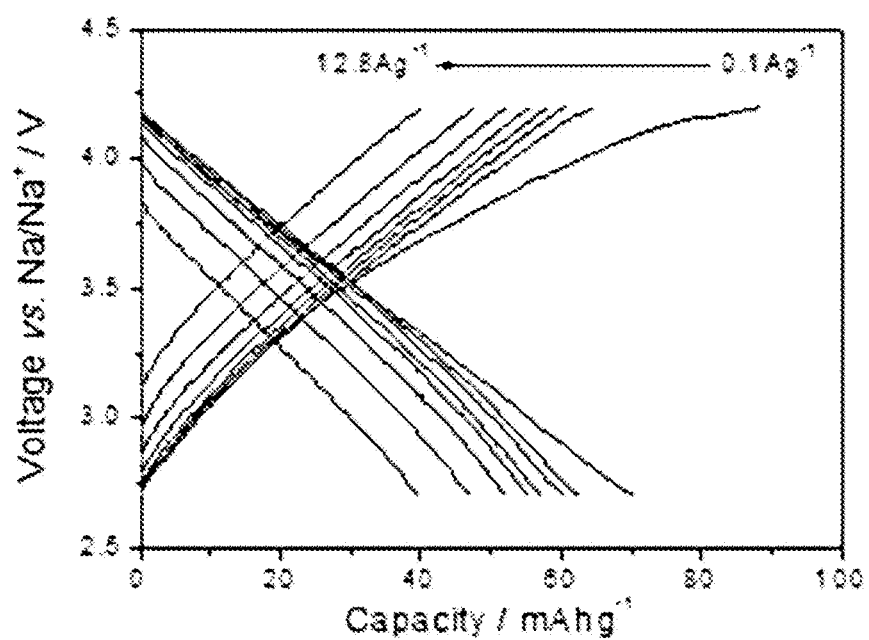
FIG. 13 shows galvanostatic discharge/charge profiles of PSNC within voltage window of 2.7-4.2 V vs. Na/Na+.

In an exemplary embodiment of the present invention, an Na-ion capacitor (NIC) device is built employing NOFC-650 as the negative electrode, i.e., the anode. A peanut shell derived nanosheet carbon (PSNC) is employed as the positive electrode, i.e. the cathode. Nanosheet carbons or carbons with graphene or 2D morphology may be employed as the cathode as well. The rationale behind this architecture is that NOFC-650 gives the most reversible capacity down to full sodiation, whereas PSNC is optimum at high voltages. In current NIC devices, PSNC is operated between 2.7-4.2V at various current densities. The primary charge storage mechanism of PSNC within this voltage window is reversible adsorption of ClO$_4$-. Limited amount of Na$^+$ will also be adsorbed at voltages near 2.7V and will become desorbed as the electrode swings to 4.2V. As shown in FIG. 13, PSNC electrode delivers a reversible capacity of 72 mAhg$^{-1}$ at 0.1 Ag$^{-1}$, all the way to 40 mAhg$^{-1}$ at 12.8 Ag$^{-1}$. Such rate capability is substantially superior to other carbon-based cathodes reported in literature, making PSNC an ideal choice to oppose NOFC in hybrid cell.

Per a given device voltage window, it is possible to control the voltage swing of the cathode vs. that of the anode by changing their mass loading ratio. Tuning the mass loading also allows for optimum matching of the cathode capacity to the higher anode capacity, with minimum unutilized active material in either one.

Figure 14A:
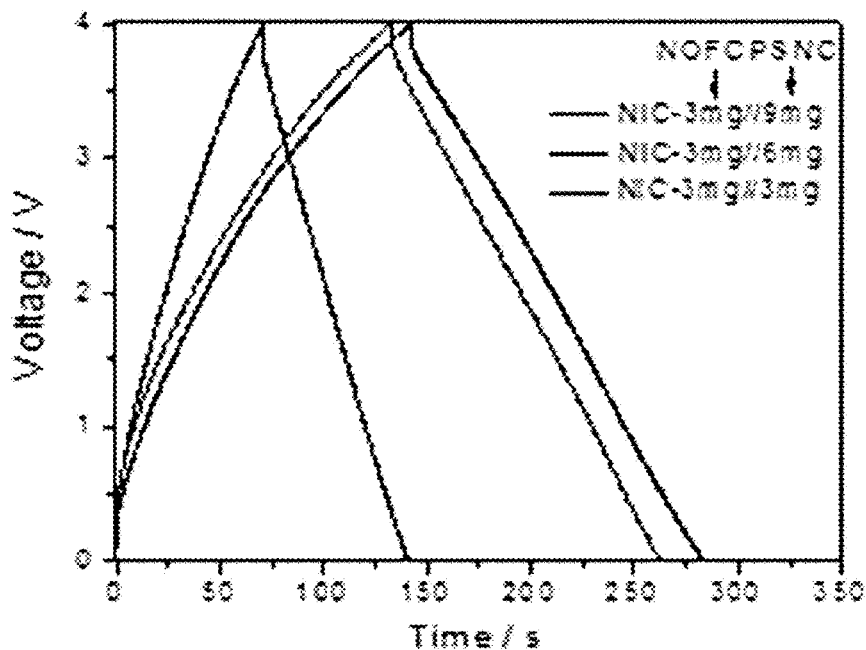
FIGS. 14A-14D illustrate electrochemical performance of NOFC-650//PSNC Na-ion capacitor devices according to the present invention with different cathode to anode mass ratios.
Figure 14C:
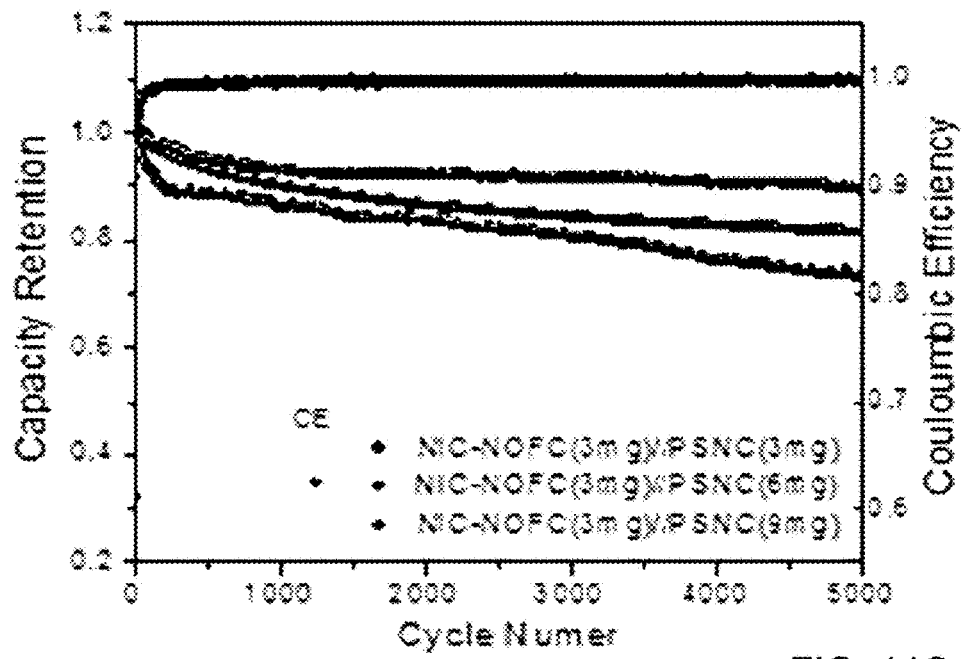
Figure 14B:
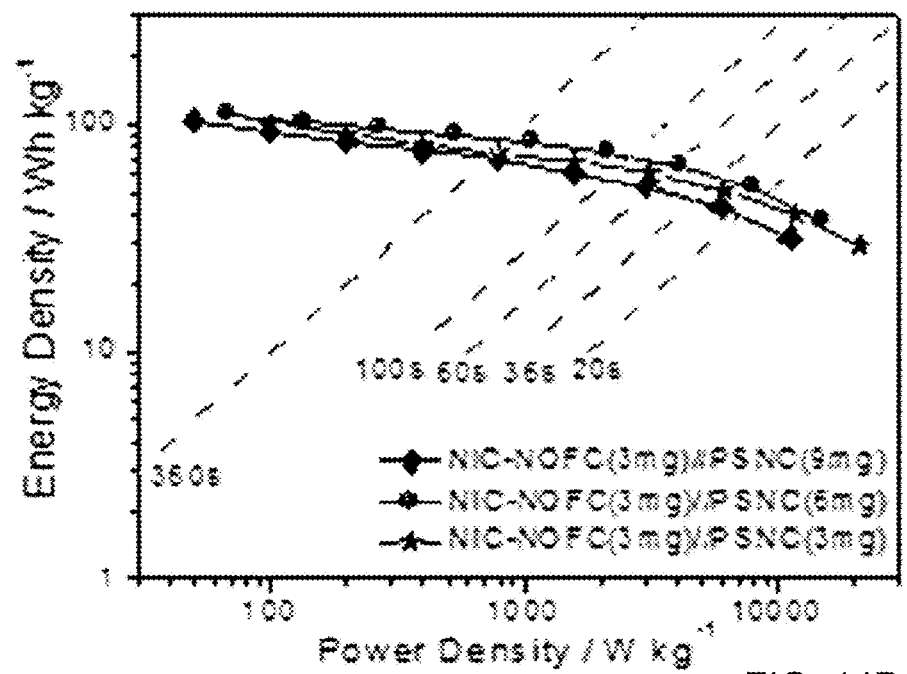
Figure 14D:
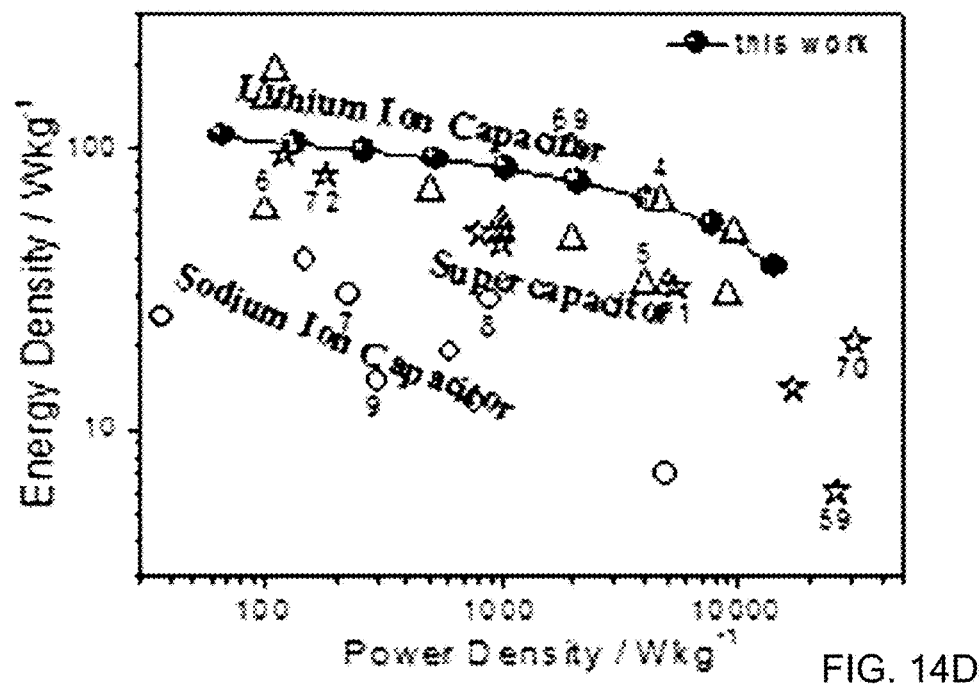
Figure 15:
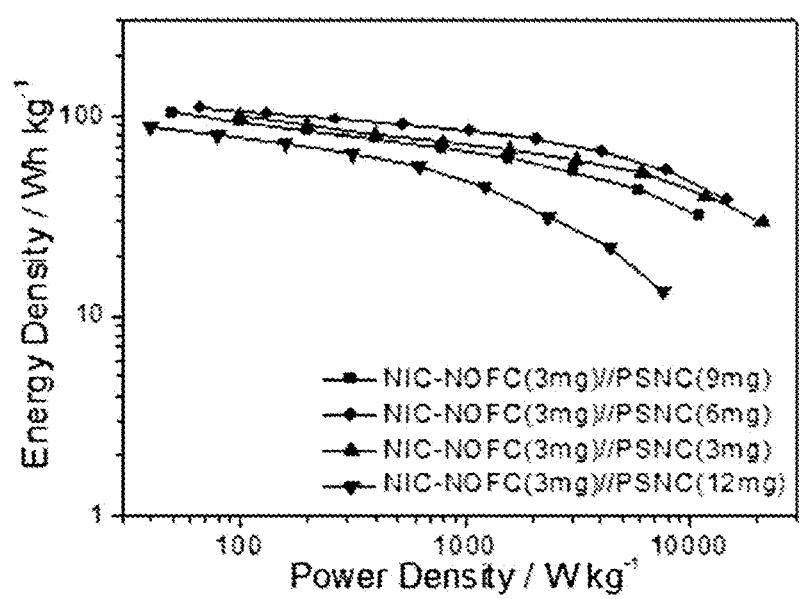
FIG. 15 is a Ragone plot of the NIC devices with different mass loading ratio.

The electrochemical performance of NOFC//PSNC NIC devices according to the present invention is shown in FIGS. 14A-14D. In the present example, all the devices were tested at 0-4V. To find the optimum mass loading, the devices were systematically tested with ratios 1:1, 1:2, 1:3 and 1:4. As shown in FIG. 15, with increasing mass of the cathode, the energy firstly increased and then decreased, revealing 1:2 is the best choice. FIG. 14A provide the galvanostatic charge/discharge profiles of the NIC devices at a current density of 3.2 Ag$^{-1}$. According to the discharge profiles, the total active mass normalized capacity is 31.3, 38.8, 31.5 mAhg$^{-1}$ for NOFC (3 mg)//PSNC (3 mg), NOFC (3 mg)//PSNC (6 mg) and NOFC (3 mg)//PSNC (9 mg), respectively. FIG. 14B displays the Ragone plot of NOFC//PSNC devices, with the specific energy and power densities likewise calculated based on the total active mass.

The assembled devices according to the present invention deliver exceptional energy-power combinations. In the present example, the optimized device NOFC (3 mg)//PSNC (6 mg) exhibited the highest energy density of 111 Whkg$^{-1}$ at power of 67 Wkg$^{-1}$. This energy output is about 2× higher than typically reported values for best performing supercapacitors based on organic, aqueous or ion liquid electrolytes (typically 50 Whkg$^{-1}$ or less), and may be attributed to both effective electrode design and the utility of employing Na$^+$/ClO$_4$- as charge carriers. An NIC device according to the present invention can complete charge/discharge within 60 s while maintaining an energy density of 70 Whkg$^{-1}$. An impressive energy density of 38 Whkg$^{-1}$ is delivered at a very power density of 14,550 Wkg$^{-1}$. Such high power performance is attributable to the facile ion transfer and adsorption kinetics in both electrodes.

The cycling performance of NOFC//PSNC devices was investigated at a current density of 6.4 Ag$^{-1}$, which corresponds to a practical working power output for an ion capacitor device. As shown in FIG. 14C, all three electrodes were stable, retain 81%-90% of their initial capacity after 5,000 cycles. It may be seen that cycling capacity retention worsened with increasing cathode to anode mass ratio. Since the total charge transferred between the anode and the cathode has to balance (neglecting CE losses), a higher cathode to anode mass ratio results in a deeper voltage swing on the anode side. With Na ions, which are 39% larger than Li ions, structural damage is expected from prolonged insertion/extraction into any anode material. In non-graphitic carbons employed for Na ion applications, reversible Na intercalation occurs at voltages roughly below 0.2 V vs. Na/Na$^+$. This would explain the observed trend, which would be caused by the increased structural degradation of the NOFC anodes that intercalate Na to some extent.

The highest energy-power electrode, NOFC (3 mg)//PSNC (6 mg), maintained 86% of its capacity after 5,000 cycles. The right axis of FIG. 14C displays the Coulombic efficiency of NOFC (3 mg)//PSNC (6 mg) device, which range from 99-100% through cycling. Table 2 below demonstrated a comparison of the cyclability of NOFC//PSNC to the previously published NIC and LIC devices. As NOFC//

PSNC is a carbon-carbon system that undergoes minimal volumetric changes as a result of charge storage, it is in general more stable than hybrid inorganic-carbon systems that undergo major volume changes due to conversion or alloying reactions.

TABLE 2

| Hybrid system | Voltage Window | Current density | Cycled number | Capacity retention |
|---|---|---|---|---|
| NOFC (3 mg)//PSNC (3 mg) (Na$^+$) | 0-4 V | 6.4 Ag$^{-1}$ | 1000/5000 | 92%/90% |
| NOFC (3 mg)//PSNC (6 mg) (Na$^+$) | 0-4 V | 6.4 Ag$^{-1}$ | 1000/5000 | 90%/86% |
| NOFC (3 mg)//PSNC (9 mg) (Na$^+$) | 0-4 V | 6.4 Ag$^{-1}$ | 1000/5000 | 88%/81% |
| Na$_x$H$_{2-x}$Ti$_3$O$_7$//AC (Na$^+$) | 0-3 V | 0.25 Ag$^{-1}$ | 1000 | 73% |
| V$_2$O$_5$/CNT//AC (Na$^+$) | 0-2.8 V | 60 C | 900 | 78% |
| NiCo$_2$O$_4$//AC (Na$^+$) | 0-3 V | 0.15 Ag$^{-1}$ | 2000 | 62.50% |
| MnO/CNS//CNS (Li$^+$) | 0-4 V | 5 Ag$^{-1}$ | 5000 | 82% |
| Fe$_3$O$_4$/Graphene//3D-Graphene (Li$^+$) | 1-4 V | 2 Ag$^{-1}$ | 1000 | 68% |
| Li$_4$Ti$_5$O$_{12}$//AC (Li$^+$) | 1-3 V | 1.5 Ag$^{-1}$ | 2000 | 80% |

The optimized NOFC//PSNC NIC device according to the present invention excels over the best energy storage systems reported in literatures. Systems including organic Na-ion capacitors, Li-ion capacitors (LICs), aqueous asymmetric supercapacitors and ionic liquid supercapacitors were plotted for a systemic comparison. As shown in FIG. 14D, NOFC//PSNC (solid black spheres) exhibited quite favorable energy/power characteristics as compared to other NICs reported, such as Na$_x$H$_{2-x}$Ti$_3$O$_7$//AC, V$_2$O$_5$—CNT//AC, NiCo$_2$O$_4$//AC. LICs configurations, including Fe$_3$O$_4$-graphene//3D-graphene, Li$_4$Ti$_5$O$_{12}$//AC, 3D-TiO$_2$/CNT//AC, carbon based graphite//AC. The NOFC//PSNC NICs according to the present invention deliver significantly higher energy at comparable power, as compared to asymmetric supercapacitors (e.g., MnO$_2$/active-graphene//activated graphene, 2D-MnO$_2$//graphene, Ni(OH)$_2$-graphene//porous graphene and symmetric ionic liquid supercapacitors. In fact, the Ragone plot of NOFC//PSNC effectively located within the Li-ion capacitor regime (marked as red circle), making it very competitive in practical application, where it would be expected to be more economical. Further, the present invention is unique in tailoring the carbon's structure/chemistry (ample defective graphene but no graphite, macroscopically open, high surface area with 50% mesoporosity, record N and O content) to maximize facile ion adsorption.

As one of skill in the art will understand, the invention is not limited to sodium ion energy storage devices. The carbon materials disclosed herein, in various forms including activated carbon and carbon nanosheets, may be utilized in a variety of energy-storage devices, such as, a combined battery-supercapacitor energy storage device (also called supercapattery or batpacitor), and an ion energy storage device, as an anode (e.g., in a half-cell), a cathode (e.g., in a half-cell) or both (in a full-cell) with sodium, lithium, and/or any number of other electrolytes and active ions. By way of example, the activated carbon materials may be used as electrodes, such as, for instance, an anode, a cathode, as any other supporting material (i.e., secondary addition), etc., for use, for instance, with a variety of energy storage applications, such as, battery, supercapacitor, batpacitor, hybrid ion device, and the like.

In some embodiments, the activated carbon materials may be used in any device employing standard or research-grade secondary or primary battery or supercapacitor or combination of thereof utilizing electrolytes and/or active ions, such as, organic electrolytes (e.g., ethylene carbonate, (EC), diethyl carbonate (DEC), dimethyl carbonate (DMC), acetonitrile (CH3CN), propylene carbonate, tetrahydrofuran, γ-butyrolactone, and solutions with quaternary ammonium salts or alkyl ammonium salts, such as, tetraethylammonium tetrafluoroborate), ionic liquid electrolytes, aqueous electrolytes (e.g., aqueous KOH, aqueous H$_2$SO$_4$, Li$_2$SO$_4$, Na$_2$SO$_4$) and the like. By way of example, in such energy storage devices, the activated carbon material may be undoped carbon material. Further, the carbon materials may be utilized in any of the energy storage devices that employ charge transfer ions, such as, ions of lithium (Li), sodium (Na), potassium (K), calcium (Ca), magnesium (Mg), aluminum (Al), hydrogen (H), hydroxide (OH), any of the associated negative counter ions, such as ClO$_4^-$, PF$_6^-$ or any combinations of thereof. In some embodiments, the energy storage device employs only ions in the electrolyte and/or metal source added to one or both electrodes.

The carbon materials and structures disclosed herein may also be utilized in a variety of energy-storage devices, for instance, as an anode, where the cathode may be or include a lithium iron phosphate (LFP), a nickel cobalt aluminum (NCA), a nickel manganese cobalt (NMC), a lithium cobalt oxide (LCO), and a ceramic positive electrode. Alternatively, the activated carbon materials disclosed herein may also be used a cathode, where the anode may be or include an oxide-based anode, a lithiated tin anode, a lithium metal anode, a sulfur-based anode, a selenium anode, a graphite anode, an activated carbon anode, a graphene anode, a silicon anode, a tin anode, an alloy anode, an oxide anode, a sulfide anode, a nitride anode, and a negative electrode.

In one embodiment, the carbon is embodied in a high surface area carbon nanosheet for use in a battery, supercapacitor and hybrid ion capacitor cathode. The carbon may also be used as a supporting material with other carbon and non-carbon active materials, as anode materials, as supports for active phases such as Si, Sn, etc.

The carbon materials and structures disclosed herein may also be used in an energy-storage device, such as, electrochemical capacitor, primary or secondary battery, a flow battery, a dionization capacitor, a supercapattery, and other energy storage system based on ions that are reversibly or irreversibly stored at a positive electrode and a negative electrode, having a housing that conforms to standardized battery dimensions. In a one example, the standardized battery dimensions may be, or may include, for instance, cylindrical cells of 18.6 diameter×65.2 length, prismatic pouch cells of a range of sizes, automotive lead-acid battery scale cells that are rectangular, D-cell dimensions such as, 32.5×61.5 mm, etc. By way of example, the batpacitor may be disposed in the housing and electrically coupled to the housing. The housing may include a form factor of a pouch cell battery, a rectangular automotive started battery scale cell, D-cell sized battery, a C-cell sized battery, an AA-cell sized battery, an AAA-cell sized battery, a 18650 lithium ion battery, or a 26650 lithium ion battery, such that the energy storage device may take the form of a commercial battery.

Although the invention has been described with reference to a particular arrangement of parts, features and the like, these are not intended to exhaust all possible arrangements or features, and indeed many modifications and variations will be ascertainable to those of skill in the art.

What is claimed is:

1. An energy storage device, comprising:
   an anode;
   a cathode, at least one of said anode and said cathode comprising a nitrogen and oxygen functionalized carbon (NOFC);
   the NOFC including a nitrogen content greater than 4 wt %, an oxygen content greater than 8 wt %, and a surface area greater than 800 m$^2$ g$^{-1}$.

2. The device of claim 1, wherein the NOFC is derived from a polypyrrole hydrogel precursor.

3. The device of claim 1, wherein the nitrogen content is greater than 8 wt %.

4. The device of claim 1, wherein the nitrogen content is greater than 13 wt %.

5. The device of claim 4, wherein the oxygen content is greater than 11 wt %.

6. The device of claim 1, wherein the NOFC has at least 40% mesoporosity and at least 40% microporosity.

7. The device of claim 6, wherein the NOFC has at least 50% mesoporosity.

8. The device of claim 1, wherein the at least one of said anode and said cathode comprising the NOFC has a reversible capacity of at least about 279 mAhg$^{-1}$.

9. The device of claim 1, wherein the at least one of said anode and said cathode comprising the NOFC has a reversible capacity of at least about 388 mAhg$^{-1}$.

10. The device of claim 9, wherein the reversible capacity is at least about 437 mAhg$^{-1}$, and wherein the at least one of said anode and said cathode comprising the NOFC has a rate capability of at least about 100 mAhg$^{-1}$.

11. The device of claim 1, wherein the anode comprises the NOFC and the cathode is a peanut shell derived nanosheet carbon (PSNC).

12. The device of claim 1, wherein the device is one of a sodium ion capacitor, a lithium ion capacitor, or a hybrid ion capacitor.

13. The device of claim 1, wherein the device is a hybrid ion capacitor.

14. The device of claim 1, wherein the NOFC has a surface area of at least about 945 m$^2$g$^{-1}$.

15. The device of claim 1, wherein the device has an at least 79% capacity retention at 5,000 charge/discharge cycles.

16. A energy-storage device, comprising:
   a housing, said housing comprising dimensions that conform to standardized battery dimensions; and
   a capacitor cell, said capacitor cell disposed in the housing and electrically coupled to said housing, wherein said capacitor cell comprises at least one of a positive electrode and a negative electrode, the at least one of the positive electrode and the negative electrode comprising an activated carbon material;
   wherein the activated carbon material comprises a nitrogen content greater than 4 wt %, an oxygen content greater than 8 wt %, and a surface area greater than 800 m$^2$ g$^{-1}$.

17. The energy-storage device of claim 16, wherein the at least one of the positive electrode and the negative electrode comprising the activated carbon material has a reversible capacity of at least 279 mAh g$^{-1}$.

18. The energy-storage device of claim 17, wherein the reversible capacity is at least about 437 mAh g$^{-1}$, and wherein the electrode has a rate capability of at least about 100 mA g$^{-1}$.

19. The energy-storage device of claim 16, wherein said housing comprises a form factor of one of a D-cell sized battery, a pouch cell, a rectangular automotive starter battery scale cell, a C-cell sized battery, an AA-cell sized battery, an AAA-cell sized battery, a 18650 lithium ion battery, or a 26650 lithium ion battery.

20. An electrode fabricated from an activated carbon material, comprising:
   a nitrogen content of at least 4 wt %;
   an oxygen content of at least 8 wt %;
   a surface area greater than 800 m$^2$g$^{-1}$; and
   a reversible capacity of at least 279 mAh g$^{-1}$.

21. The electrode of claim 20, wherein the reversible capacity is at least about 437 mAh g$^{-1}$.

22. The electrode of claim 21, wherein the electrode has a rate capability of at least about 100 mA g$^{-1}$.

23. The electrode of claim 20, wherein the surface area is at least about 945 m$^2$ g$^{-1}$.

24. The electrode of claim 20, wherein the electrode is a cathode of a hybrid ion capacitor.

25. The electrode of claim 20, wherein the activated carbon material is based on a precursor comprising one of a hydrogel, an aerogel, a commercial polymer, a hemp material, or a peanut material.

26. The electrode of claim 20, wherein the activated carbon material is embodied in a carbon nanosheet.

* * * * *